United States Patent
Sostaric et al.

(10) Patent No.: US 8,989,905 B2
(45) Date of Patent: Mar. 24, 2015

(54) METHOD AND SYSTEM FOR CALCULATING AND REPORTING SLUMP IN DELIVERY VEHICLES

(75) Inventors: Joseph Howard Sostaric, Cincinnati, OH (US); Michael Topputo, Hamilton, OH (US); Steve Verdino, Hamilton, OH (US); Andrew S. Morrison, Loveland, OH (US)

(73) Assignee: Verifi LLC, West Chester, OH (US)

( * ) Notice: Subject to any disclaimer, the term of this patent is extended or adjusted under 35 U.S.C. 154(b) by 1505 days.

(21) Appl. No.: 11/834,002

(22) Filed: Aug. 5, 2007

(65) Prior Publication Data

US 2009/0037026 A1 Feb. 5, 2009

(51) Int. Cl.
| | | |
|---|---|---|
| G05B 15/00 | (2006.01) | |
| H02H 7/00 | (2006.01) | |
| B28C 5/42 | (2006.01) | |
| B28B 23/00 | (2006.01) | |
| B28C 7/02 | (2006.01) | |
| B28C 7/04 | (2006.01) | |

(52) U.S. Cl.
CPC ............. B28C 5/422 (2013.01); B28B 23/0031 (2013.01); B28C 7/02 (2013.01); B28C 7/0418 (2013.01)
USPC .............................................. 700/265; 361/1

(58) Field of Classification Search
USPC .............................................. 700/265; 361/1
See application file for complete search history.

(56) References Cited

U.S. PATENT DOCUMENTS

| | | | | |
|---|---|---|---|---|
| 3,767,170 A | * | 10/1973 | Morgenstern ..................... | 366/3 |
| 3,891,193 A | * | 6/1975 | Perry, Jr. .......................... | 366/31 |
| 4,008,093 A | * | 2/1977 | Kitsuda et al. ................. | 106/638 |
| 4,070,199 A | * | 1/1978 | Downing et al. ............. | 106/696 |
| 4,072,435 A | * | 2/1978 | Coho et al. ..................... | 404/110 |
| 4,117,901 A | * | 10/1978 | Mustered ......................... | 180/23 |
| 4,117,906 A | * | 10/1978 | Mustered ....................... | 180/420 |
| 4,182,191 A | * | 1/1980 | Ikeda .............................. | 73/803 |

(Continued)

FOREIGN PATENT DOCUMENTS

| | | |
|---|---|---|
| CA | 2246191 A1 | 3/1999 |
| EP | 0126573 | 11/1984 |

OTHER PUBLICATIONS

Hofmann et al., Remote Monitoring and Diagnostics of Large Rotation Machinery, 2003, IEEE, p. 47-55.*

(Continued)

*Primary Examiner* — Robert Fennema
*Assistant Examiner* — Thomas Stevens
(74) *Attorney, Agent, or Firm* — Wood, Herron & Evans, LLP

(57) ABSTRACT

A system for managing a concrete delivery vehicle having a mixing drum 14 and hydraulic drive 16 for rotating the mixing drum, including a rotational sensor 20 configured to sense a rotational speed of the mixing drum, a hydraulic sensor 22 coupled to the hydraulic drive and configured to sense a hydraulic pressure required to turn the mixing drum, a temperature sensor for sensing temperature of the drum, and a communications port 26 configured to communicate a slump calculation to a status system 28 commonly used in the concrete industry, wherein the sensing of the rotational speed of the mixing drum is used to qualify a calculation of current slump based on the hydraulic pressure required to turn the mixing drum. Temperature readings are further used to qualify or evaluate a load. Also, water purge connections facilitate cold weather operation.

4 Claims, 21 Drawing Sheets

(56) References Cited

U.S. PATENT DOCUMENTS

| | | | | |
|---|---|---|---|---|
| 4,245,915 | A * | 1/1981 | Bracegirdle | 366/12 |
| 4,318,177 | A | 3/1982 | Rapp et al. | |
| 4,337,619 | A * | 7/1982 | Wyatt | 60/39.55 |
| 4,749,431 | A * | 6/1988 | Fassle et al. | 156/245 |
| 4,900,154 | A | 2/1990 | Waitzinger et al. | |
| 5,064,292 | A * | 11/1991 | Sutton | 366/2 |
| 5,152,605 | A * | 10/1992 | Yamada et al. | 366/148 |
| 5,407,299 | A * | 4/1995 | Sutton | 404/75 |
| 5,567,236 | A * | 10/1996 | Schapira et al. | 106/728 |
| 5,713,663 | A * | 2/1998 | Zandberg et al. | 366/8 |
| 5,752,768 | A | 5/1998 | Assh | |
| 5,857,490 | A * | 1/1999 | Kao | 137/625.45 |
| 5,895,116 | A * | 4/1999 | Kreinheder et al. | 366/8 |
| 6,224,250 | B1 | 5/2001 | Kreinheder et al. | |
| 6,227,039 | B1 | 5/2001 | Te'eni | |
| 6,343,896 | B1 * | 2/2002 | Goodier et al. | 406/43 |
| 6,484,079 | B2 * | 11/2002 | Buckelew et al. | 701/29 |
| 6,682,655 | B2 * | 1/2004 | Beckham et al. | 210/740 |
| 6,728,638 | B2 * | 4/2004 | Newman | 702/5 |
| 6,805,478 | B2 * | 10/2004 | Aizawa et al. | 366/1 |
| 6,808,303 | B2 * | 10/2004 | Fisher | 366/3 |
| 6,862,521 | B1 * | 3/2005 | Fox | 701/204 |
| 6,866,047 | B1 * | 3/2005 | Marvin | 134/22.1 |
| 7,006,009 | B2 * | 2/2006 | Newman | 340/854.5 |
| 7,064,677 | B2 * | 6/2006 | Newman | 340/854.6 |
| 2002/0077750 | A1 * | 6/2002 | McDonald et al. | 701/213 |
| 2002/0108537 | A1 * | 8/2002 | Beckham et al. | 106/745 |
| 2004/0031793 | A1 * | 2/2004 | Garcia | 220/1.5 |
| 2004/0039527 | A1 * | 2/2004 | McDonald et al. | 701/213 |
| 2004/0252745 | A1 * | 12/2004 | Park et al. | 374/102 |
| 2006/0054056 | A1 * | 3/2006 | Jungk | 106/38 |
| 2007/0194019 | A1 * | 8/2007 | Seagle et al. | 220/4.08 |
| 2008/0027584 | A1 * | 1/2008 | Andersen et al. | 700/265 |
| 2008/0103662 | A1 * | 5/2008 | Pillar et al. | 701/50 |
| 2008/0298160 | A1 * | 12/2008 | Kay et al. | 366/23 |
| 2008/0316856 | A1 * | 12/2008 | Cooley et al. | 366/142 |

OTHER PUBLICATIONS

Shepherdson, Robin: "Touch screen batch paint makes Con cast's pipe production go round"; Concrete Plant International, Issue 02-02, p. 1-3.

Scale-Tron Inc.; "MixTron II mixer water dosing" product pamphlet, p. 1-2.

Ultacontrol; "Introducing the All New Ultameter Digital Central Mix Concrete Slump Meter and Slump Control"; product pamphlet, copyright 2000. p. 1-2.

Hugh Wang et al., Interaction of Materials Used in Concrete, Concrete International, Apr. 2006, pp. 47-52.

Dirk Lowke et al., Effect of Mixing Energy on Fresh Properties of SCC, Paper, Technical University of Munich, Centre of Building Materials p. 1-8.

* cited by examiner

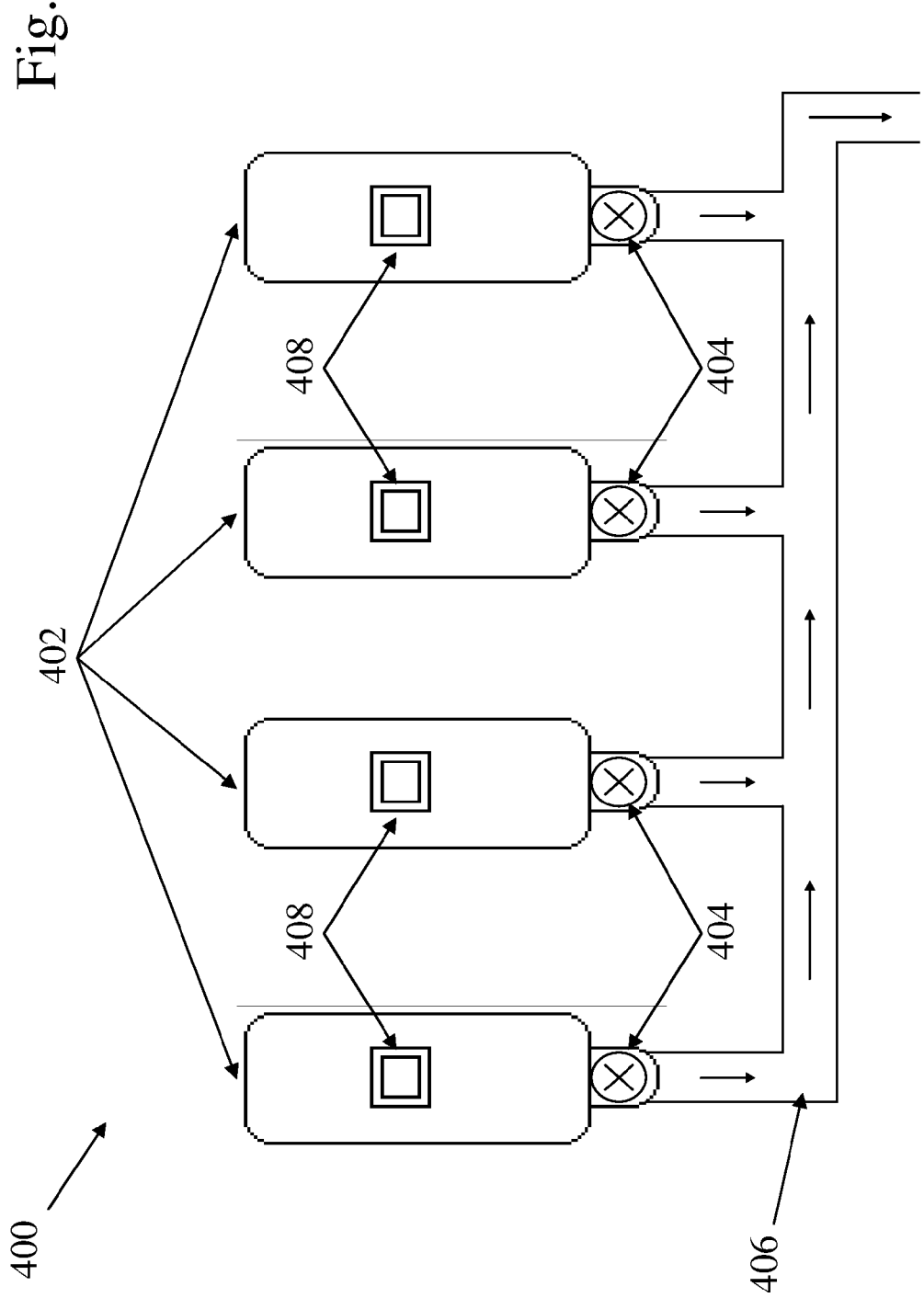

Fig. 7B

| Type | Purpose |
| --- | --- |
| Accelerators | accelerate the set time of the concrete |
| Retarders | delay the set time of the concrete |
| Viscosity modifiers | allow for the production of self-consolidating concrete |
| Plasticizers | increase the slump of the concrete without the addition of water |
| Hydration stabilizers | stopping the hydration process of the cement or a catalyst that can "wake the concrete up" |
| Air entraining agents | entraining air in concrete for better performance in freeze-thaw environments |
| Specialty application admixtures | such as anti-washout agents (allow for concrete to be placed underwater), water repellant admixtures, and corrosion inhibitors |
| Liquid color systems | adding pigment to concrete |

Fig. 7C
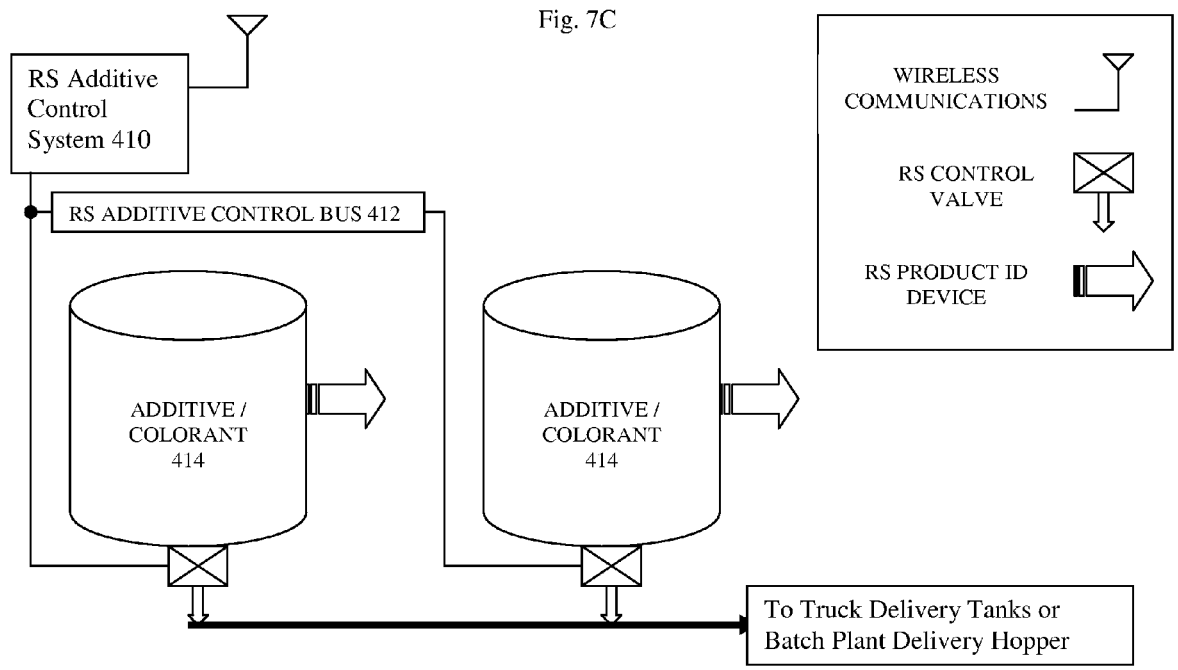
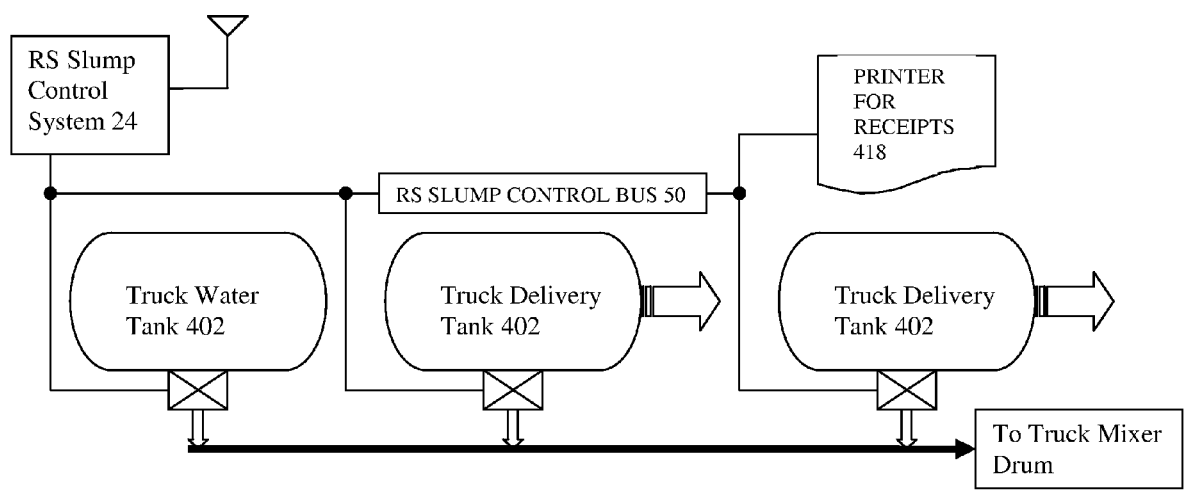

METHOD AND SYSTEM FOR CALCULATING AND REPORTING SLUMP IN DELIVERY VEHICLES

CROSS REFERENCE TO RELATED APPLICATIONS

This application is related to pending U.S. application Ser. No. 10/599,130, which was filed Feb. 14, 2005 as a PCT Application designating the United States claiming priority to U.S. Provisional Application 60/554,720, and which subsequently entered the U.S. National Phase and is now pending, and is related to U.S. application Ser. No. 11/764,832, filed Jun. 19, 2007. All of the above-mentioned applications are hereby incorporated by reference.

FIELD OF THE INVENTION

The present invention generally relates to delivery vehicles and particularly to mobile concrete mixing trucks that mix and deliver concrete. More specifically, the present invention relates to the calculation and reporting of slump using sensors associated with a concrete truck.

BACKGROUND OF THE INVENTION

Hitherto it has been known to use mobile concrete mixing trucks to mix concrete and to deliver that concrete to a site where the concrete may be required. Generally, the particulate concrete ingredients are loaded at a central depot. A certain amount of liquid component may be added at the central depot. Generally the majority of the liquid component is added at the central depot, but the amount of liquid is often adjusted. The adjustment is often unscientific, the driver adds water from any available water supply (sometimes there is water on the truck) by feeding a hose directly into the mixing barrel and guessing as to the water required. Operators attempt to tell by experience the correct or approximate volume of water to be added according to the volume of the particulate concrete ingredients. The adding of the correct amount of liquid component is therefore usually not precise.

It is known that if concrete is mixed with excess liquid component, the resulting concrete mix does not dry with the required structural strength. At the same time, concrete workers tend to prefer more water, since it makes concrete easier to work. Accordingly, slump tests have been devised so that a sample of the concrete mix can be tested with a slump test prior to actual usage on site. Thus, if a concrete mixing truck should deliver a concrete mix to a site, and the mix fails a slump test because it does not have sufficient liquid component, extra liquid component may be added into the mixing barrel of the concrete mixing truck to produce a required slump in a test sample prior to actual delivery of the full contents of the mixing barrel. However, if excess water is added, causing the mix to fail the slump test, the problem is more difficult to solve, because it is then necessary for the concrete mixing truck to return to the depot in order to add extra particulate concrete ingredients to correct the problem. If the extra particulate ingredients are not added within a relatively short time period after excessive liquid component has been added, then the mix will still not dry with the required strength.

In addition, if excess liquid component has been added, the customer cannot be charged an extra amount for return of the concrete mixing track to the central depot for adding additional particulate concrete ingredients to correct the problem. This, in turn, means that the concrete supply company is not producing concrete economically.

One method and apparatus for mixing concrete in a concrete mixing device to a specified slump is disclosed by Zandberg et al. in U.S. Pat. No. 5,713,663 (the '663 patent), the disclosure of which is hereby incorporated herein by reference. This method and apparatus recognizes that the actual driving force to rotate a mixing barrel filled with particulate concrete ingredients and a liquid component is related to the volume of the liquid component added. In other words, the slump of the mix in the barrel at that time is related to the driving force required to rotate the mixing barrel. Thus, the method and apparatus monitors the torque loading on the driving means used to rotate the mixing barrel so that the mix may be optimized by adding a sufficient volume of liquid component in attempt to approach a predetermined minimum torque loading related to the amount of the particulate ingredients in the mixing barrel.

More specifically, sensors are used to determine the torque loading. The magnitude of the torque sensed may then be monitored and the results stored in a storage means. The storage means can subsequently be accessed to retrieve information therefrom which can be used, in turn, to provide processing of information relating to the mix. In one case, it may be used to provide a report concerning the mixing.

Improvements related to sensing and determining slump are desirable.

Other methods and systems for remotely monitoring sensor data in delivery vehicles are disclosed by Buckelew et al. in U.S. Pat. No. 6,484,079 (the '079 patent), the disclosure of which is also hereby incorporated herein by reference. These systems and methods remotely monitor and report sensor data associated with a delivery vehicle. More specifically, the data is collected and recorded at the delivery vehicle thus minimizing the bandwidth and transmission costs associated with transmitting data back to a dispatch center. The '079 patent enables the dispatch center to maintain a current record of the status of the delivery by monitoring the delivery data at the delivery vehicle to determine whether a transmission event has occurred. The transmission events are defined by the dispatch center to include those events that mark delivery progress. When a transmission event occurs, the sensor data and certain event data associated with the transmission event may be transmitted to the dispatch center. This enables the dispatch center to monitor the progress and the status of the delivery without being overwhelmed by unnecessary information. The '079 patent also enables data concerning the delivery vehicle and the materials being transported to be automatically monitored and recorded such that an accurate record is maintained for all activity that occurs during transport and delivery.

The '079 patent remotely gathers sensor data from delivery vehicles at a dispatch center using a highly dedicated communications device mounted on the vehicle. Such a communications device is not always compatible with status systems used in the concrete industry.

Improvements related to monitoring sensor data in delivery vehicles using industry standard status systems are desirable.

A further difficulty has arisen with the operation of concrete delivery vehicles in cold weather conditions. Typically a concrete delivery truck carries a water supply for maintaining the proper concrete slump during the delivery cycle. Unfortunately this water supply is susceptible to freezing in cold weather, and/or the water lines of the concrete truck are susceptible to freezing. The truck operator's duties should include monitoring the weather and ensuring that water supplies do not freeze; however, this is often not done and concrete trucks are damaged by frozen pipes, and/or are taken out of service to be thawed after freezing.

Accordingly, improvements are needed in cold weather management of concrete delivery vehicles.

The use of chemical additives in concrete mixing is known in the art. Chemical additives may be used to control the rate of cure of concrete, improve dispersion of cement, and otherwise affect the physical characteristics of a concrete batch. Additives further influence concrete parameters like slump and "spread", which is a measure of the region over which the concrete spreads during a slump test, often an important measure for concrete that has a high slump reading. Spread is often used to measure self-consolidating or other high-slump concrete mixtures. Additives are often used in well-controlled environments such as prefabricated construction, but are less fully utilized in other less controlled environments such as on delivery vehicles, for the reason that the introduction of additives needs to be managed by a skilled operator.

Accordingly, improvements are needed in the use of chemical additives in connection with concrete delivery vehicles.

Published PCT Application PCT/US2005/004405, filed by the assignee of the present application, discloses an improved concrete truck management and slump measurement system that addresses many of the above needs; however, further improvement in management and delivery of concrete is advantageous.

SUMMARY OF THE INVENTION

According to one aspect of the invention, the use of chemical additives in concrete delivery truck is facilitated by providing a chemical additive supply on the concrete delivery truck capable of delivering chemical additive under the control or supervision of a remotely located skilled operator, so that the additive use may be supervised by skilled personnel.

In a related aspect, a concrete delivery truck incorporates a chemical additive supply that comprises plural additives each of which may be controllably delivered to the concrete mixture. The plural additives may include, for example, a stabilizer and a destabilizer, such that the mixture may be stabilized during transit and destabilized at the job site. The plural additives may alternatively or in addition include a concentrate and a diluent, powders, liquids or solids.

In a further related aspect, the concrete delivery truck may include an electronic identification system such as a radio frequency or bar code identification system for identifying the type of additive container installed on the chemical additive supply, so that the controller and/or a remotely located operator may accurately identify the type of additives in use. A novel chemical additive supply container may include a bar code, RF ID chip or other electronic means identifying its contents. Further, the container may include unique physical features which are compatible with installation at a particular location on the delivery vehicle, and plural locations each associated with a unique container so that the location of the containers may be known in addition to their presence on the concrete delivery vehicle.

BRIEF DESCRIPTION OF THE DRAWINGS

FIG. 7A is a representation of one possible embodiment of an admixture dispenser system;

FIG. 7B is a table of possible admixtures, which could be used in the admixture dispenser system;

FIG. 7C is an illustration of an additive control system used at a batch plant in conjunction with additive delivery tanks on the delivery vehicle;

DETAILED DESCRIPTION OF THE EMBODIMENTS OF THE INVENTION

Figure 1:
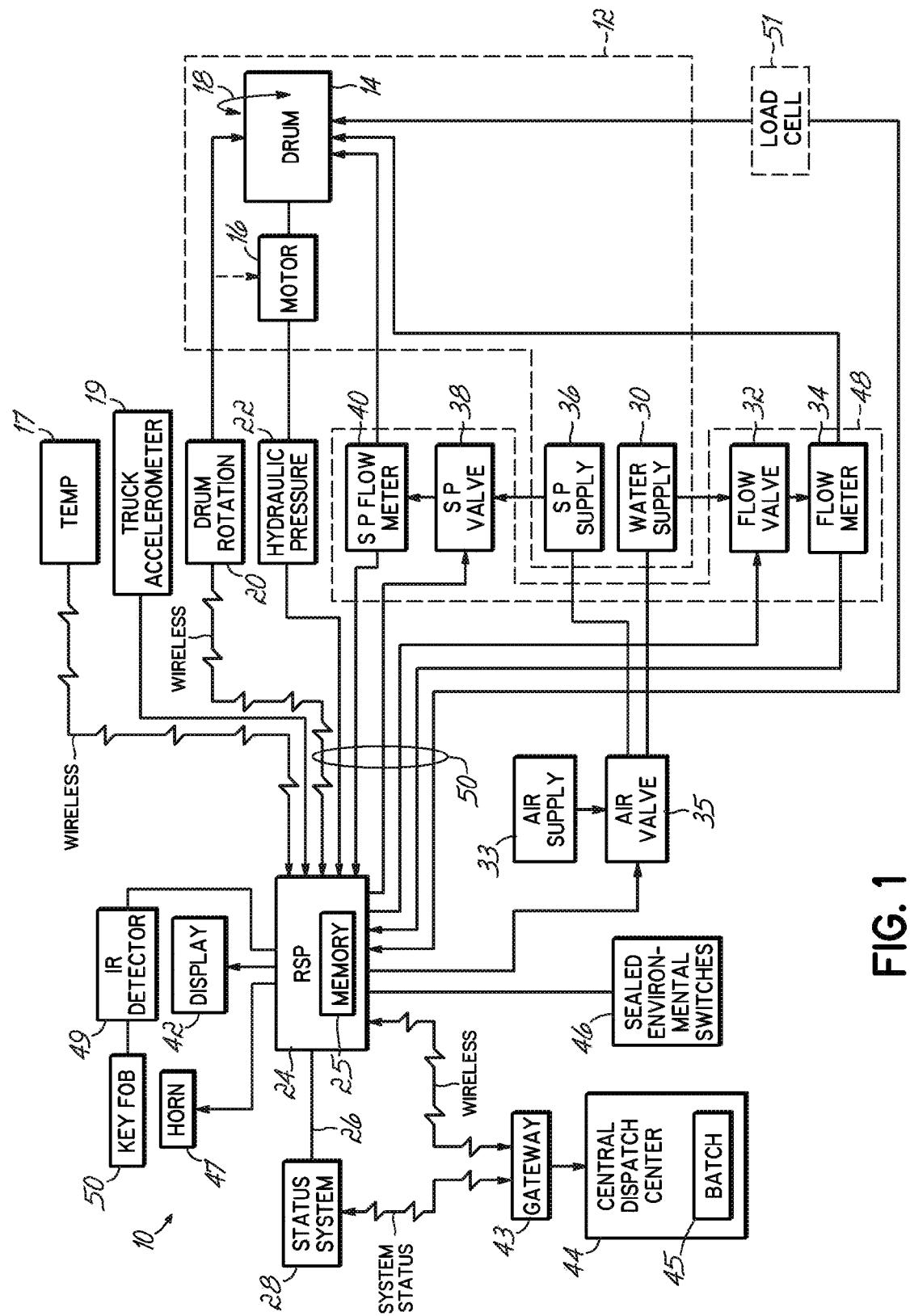
FIG. 1 is block diagram of a system for calculating and reporting slump in a delivery vehicle constructed in accordance with an embodiment of the invention.

Referring to FIG. 1, a block diagram of a system 10 for calculating and reporting slump in a delivery vehicle 12 is illustrated. Delivery vehicle 12 includes a mixing drum 14 for mixing concrete having a slump and a motor or hydraulic drive 16 for rotating the mixing drum 14 in the charging and discharging directions, as indicated by double arrow 18. System 10 comprises a dual temperature sensor 17, which may be installed directly to on the mixing drum 14, more specifically the access door of the mixing drum 14, and configured to sense both the load temperature as well as the skin temperature of the mixing drum 14. The dual temperature sensor 17 may be coupled to a wireless transmitter. A wireless receiver mounted to the truck could capture the transmitted signal from the dual temperature sensor 17 and determine the temperature of both the load and the mixing drum skin. System 10 further includes an acceleration/deceleration/tilt sensor 19, which may be installed on the truck itself, and configured to sense the relative acceleration, deceleration of the truck as well as the degree of tilt that the truck may or may not be experiencing. System 10 comprises a rotational sensor 20, which may be installed directly on or mounted to the mixing drum 14, or included in the motor driving the drum, and configured to sense the rotational speed and direction of the mixing drum 14. The rotational sensor may include a series of magnets mounted on the drum and positioned to interact with a magnetic sensor on the truck to create a pulse each time the magnet passes the magnetic sensor. Alternatively, the rotational sensor may be incorporated in the driving motor 16, as is the case in concrete trucks using Eaton, Rexroth, or other hydraulic motors and pumps. In a third potential embodiment, the rotational sensor may be an integrated accelerometer mounted on the drum of the concrete truck, coupled to a wireless transmitter. In such an embodiment a wireless receiver mounted to the truck could capture the transmitted signal from the accelerometer and determine therefrom the rotational state of the drum. System 10 further includes a hydraulic sensor coupled to the motor or hydraulic drive 16 and configured to sense a hydraulic pressure required to turn the mixing drum 14.

System 10 further comprises a processor or ready slump processor (RSP) 24 including a memory 25 electrically coupled to the hydraulic sensor 22 and the rotational sensor 20 and configured to qualify and calculate the current slump of the concrete in the mixing drum 14 based the rotational speed of the mixing drum and the hydraulic pressure required to turn the mixing drum, respectively. The rotational sensor and hydraulic sensor may be directly connected to the RSP 24 or may be coupled to an auxiliary processor that stores rotation and hydraulic pressure information for synchronous delivery to the RSP 24. The RSP 24, using memory 25, may also utilize the history of the rotational speed of the mixing drum 14 to qualify a calculation of current slump.

A communications port 26, such as one in compliance with the RS 485 modbus serial communication standard, may be configured to communicate the slump calculation to a status system 28 commonly used in the concrete industry, such as, for example, TracerNET (now a product of Trimble Navigation Limited, Sunnyvale, Calif.), which, in turn, wirelessly communicates with a central dispatch center 44. An example of a wireless status system is described by U.S. Pat. No. 6,611,755, which is hereby incorporated herein in its entirety. It will be appreciated that status system 28 may be any one of a variety of commercially available status monitoring systems.

Alternatively, or in addition, a separate communication path on a licensed or unlicensed wireless frequency, e.g. a 2.4 GHz or other frequency, e.g., 900 MHz, 433 MHz, or 418 MHz frequency, may be used for communications between RSP 24 and the central dispatch office when concrete trucks are within range of the central dispatch office, permitting more extensive communication for logging, updates and the like when the truck is near to the central office, as described below. A further embodiment might include the ability for truck-to truck communication/networking for purposes of delivering programming and status information. Upon two trucks identifying each other and forming a wireless connection, the truck that contains a later software revision could download that revision to the other truck, and/or the trucks could exchange their status information so that the truck that returns first to the ready mix plant can report status information for both to the central system. RSP 24 may also be connected to the central dispatch office or other wireless nodes, via a local wireless connection, or via a cellular wireless connection. RSP 24 may over this connection directly deliver and receive programming, ticket and state information to and from the central dispatch center without the use of a status system.

Delivery vehicle 12 further includes a water supply 30 and system 10 further comprises a flow valve 32 coupled to the water supply 30 and configured to control the amount of water added to the mixing drum 14 and a flow meter 34 coupled to the flow valve 32 and configured to sense the amount of water added to the mixing drum 14. The water supply is typically pressurized by a pressurized air supply generated by the delivery truck's engine. RSP 24 is electrically coupled to the flow valve 32 and the flow meter 34 so that the RSP 24 may control the amount of water added to the mixing drum 14 to reach a desired slump. RSP 24 may also obtain data on water manually added to the drum 14 by a hose connected to the water supply, via a separate flow sensor or from status system 28. A separate embodiment might utilize a positive displacement water pump in place of a pressurized system. This would eliminate the need for repeated pressurizing, depressurizing that may occur in the present embodiment. Also, the volume of water dispensed might be more accurately achieved. It would also facilitate direct communication between the RSP and the pump.

Delivery vehicle 12 may further include one or more chemical additive supplies 36 and system 10 may further comprise a chemical additive flow valve 38 coupled to the chemical additive supply 36 and configured to control the amount of chemical additive added to the mixing drum 14, and a chemical additive flow meter 40 coupled to the chemical additive flow valve 38 and configured to sense the amount of chemical additive added to the mixing drum 14. In one embodiment, RSP 24 is electrically coupled to the chemical additive flow valve 38 and the chemical additive flow meter 40 so that the RSP 24 may control the amount of chemical additive added to the mixing drum 14 to reach a desired slump. Alternatively, chemical additive may be manually added by the operator and RSP 24 may monitor the addition of chemical additive and the amount added. Furthermore, colorant may be similarly controlled by RSP, and delivered from a storage tank on the vehicle.

Delivery vehicle 12 further includes an air supply 33 and system 10 may further comprise an air flow valve 35 coupled to the chemical additive supply 36 and the water supply 30 and configured to pressurize the tanks containing the chemical additive supply and the water supply. In one embodiment, RSP 24 is electrically coupled to the air flow valve so that the RSP 24 may control the pressure within the chemical additive supply and the water supply.

System 10 may also further comprise an external display, such as display 42. Display 42 actively displays RSP 24 data, such as slump values. The central dispatch center can comprise all of the necessary control devices, i.e. a batch control processor 45. Wireless communication with the central dispatch center can be made via a gateway radio base station 43. It should be noted that the status system display and the display 42 may be used separately from one another or in conjunction with one another.

A set of environmentally sealed switches 46, e.g. forming a keypad or control panel, may be provided by the RSP 24 to permit control and operator input, and to permit various override modes, such as a mode which allows the delivery vehicle 12 to be operated in a less automated manner, i.e., without using all of the automated features of system 10, by using switches 46 to control water, chemical additive, and the like. (Water and chemical additive can be added manually without having to make a manual override at the keypad, in which case the amounts added are tracked by the RSP 24.) A keypad on the status system 28 may also be used to enter data into the RSP 24 or to acknowledge messages or alerts, but switches 46 may be configured as a keypad to provide such functions directly without the use of a status system.

A horn 47 is included for the purpose of alerting the operator of such alert conditions.

Operator control of the system may also be provided by an infrared or RF key fob remote control 50, interacting with an infrared or RF signal detector 49 in communication with RSP 24. By this mechanism, the operator may deliver commands conveniently and wirelessly. Furthermore, infrared or RF signals exchanged with detector 49 may be used by the status system 28 for wireless communication with central dispatch center 44 or with a batch plant controller when the truck is at the plant.

In one embodiment of the present invention, all flow sensors and flow control devices, e.g., flow valve 32, flow meter 34, chemical additive flow valve 38, and chemical additive flow meter 40, are contained in an easy-to-mount manifold 48 while the external sensors, e.g., rotational sensor 20 and hydraulic pressure sensor 22, are provided with complete mounting kits including all cables, hardware and instructions. It should be noted that all flow sensors and flow control devices can be mounted inline, separately from one another. In another embodiment, illustrated in FIG. 6, the water valve and flow meter may be placed differently, and an additional valve for manual water may be included, to facilitate cold weather operation. Varying lengths of interconnects 50 may be used between the manifold 48, the external sensors 20, 22, and the RSP 24. Thus, the present invention provides a modular system 10.

In operation, the RSP 24 manages all data inputs, e.g., drum rotation, hydraulic pressure, flow, temperature, water and chemical additive flow, to calculate current slump and determine when and how much water and/or chemical additive should be added to the concrete in mixing drum 14, or in other words, to a load. (As noted, rotation and pressure may be monitored by an auxiliary processor under control of RSP 24.) The RSP 24 also controls the water flow valve 32, an optional chemical additive flow valve 38, and an air pressure valve (not shown). (Flow and water control may also be managed by another auxiliary processor under control of the RSP 24.) The RSP 24 typically uses ticket information and discharge drum rotations and motor pressure to measure the amount of concrete in the drum, but may also optionally receive data from a load cell 51 coupled to the drum for a weight-based measurement of concrete volume. Data from load cell 51 may be used to compute and display the amount of concrete poured from the truck (also known as concrete on the ground), and the remaining concrete in the drum. Weight measurements generated by load cell 51 may be calibrated by comparing the load cell measurement of weight added to the truck, to the weight added to the truck as measured by the batch plant scales.

The RSP 24 also automatically records the slump at the time the concrete is poured, to document the delivered product quality, and manages the load during the delivery cycle. The RSP 24 has three operational modes: automatic, manual and override. In the automatic mode, the RSP 24 adds water to adjust slump automatically, and may also add chemical additive in one embodiment. In the manual mode, the RSP 24 automatically calculates and displays slump, but an operator is required to instruct the RSP 24 to make any additions, if necessary. In the override mode, all control paths to the RSP 24 are disconnected, giving the operator complete responsibility for any changes and/or additions. All overrides are documented by time and location.

Figure 2:
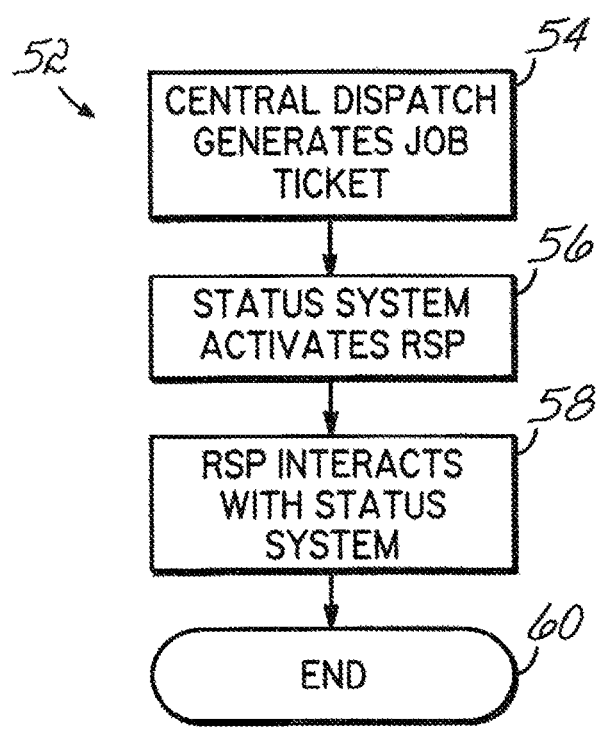
FIG. 2 is a flow chart generally illustrating the interaction of the ready slump processor and status system of FIG. 1.

Referring to FIG. 2, a simplified flow chart 52 describing the interaction between the central dispatch center 44, the status system 28, and the RSP 24 in FIG. 1 is shown. More specifically, flow chart 52 describes a process for coordinating the delivery of a load of concrete at a specific slump. The process begins in block 54 wherein the central dispatch center 44 transmits specific job ticket information via its status system 28 to the delivery vehicle's 12 on-board ready slump processor 24. The job ticket information may include, for example, the job location, amount of material or concrete, and the customer-specific or desired slump.

Next, in block 56, the status system 28 on-board computer activates the RSP 24 providing job ticket information, e.g., amount of material or concrete, and the customer-specific or desired slump. Other ticket information and vehicle information could also be received, such as job location as well as delivery vehicle 12 location and speed.

In block 58, the RSP 24 continuously interacts with the status system 28 to report accurate, reliable product quality data back to the central dispatch center 44. Product quality data may include the exact slump level reading at the time of delivery, levels of water and/or chemical additive added to the concrete during the delivery process, and the amount, location and time of concrete delivered. The process 52 ends in block 60.

Further details of the management of the RSP 24 of slump and its collection of detailed status information is provided below with reference to FIG. 4 et seq.

Figure 3:
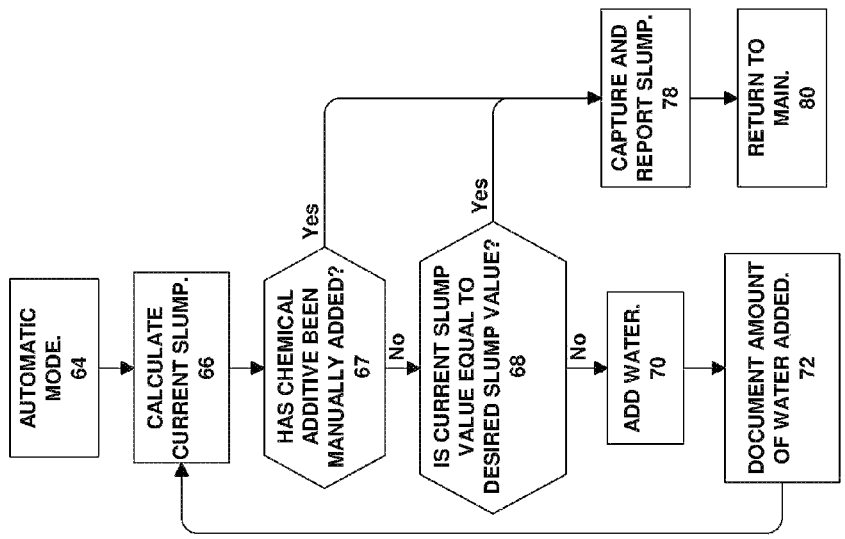
FIG. 3 is a flow chart showing an automatic mode for the RSP in FIG. 1.

Referring to FIG. 3, a flow chart 62 describing an automatic mode 64 for load management by the RSP 24 in FIG. 1 is shown. In this embodiment, in an automatic mode 64, the RSP 24 automatically incorporates specific job ticket information transmitted from the central dispatch center 44 or from gateway 43, or entered by the driver of the delivery vehicle, and obtains delivery vehicle 12 location and speed information from the status system 28, and obtains product information from delivery vehicle 12 mounted sensors, e.g., rotational sensor 20 and hydraulic pressure sensor 22. The RSP 24 then calculates current slump as indicated in block 66. The parameters for mixing may be originated by a cement or additive producer.

Block 67 determines if chemical additive has been manually added. If chemical additive has been added, then the current slump characteristics are captured and reported. Automatic water management may be disabled in the event of manual addition of additive, as such additives alter the behavior of the concrete and its need for water. However, expected introductions of additive may be handled differently; for example, addition of additive may not end water management, but merely alter the tables and parameters used in water management. Thus, as long as chemical additive has not been added, or is added in a known manner, automatic water management remains enabled, and in this case, the process moves to block 68, where the current slump is compared to the customer-specified or desired slump. If the current slump is less than to the customer-specified slump, a liquid component, e.g., water, is automatically added 70 to move toward the customer-specified slump. (The amount of water added may be less than the amount computed to create the desired slump, in order to avoid over-watering.) It should be noted that the RSP could meter the amount of chemical additive added to the mixture over time, according to a recipe. (Chemical additive typically makes concrete easier to work, and also affects the relationship between slump and drum motor pressure, but has a limited life.) Furthermore, the RSP could manage the introduction of colorant, similarly in accordance with a recipe. Once water is added, the amount of water added is documented, as indicated in block 72. Control is then looped back to block 66 wherein the current slump is again calculated. It should be noted, that once a chemical additive has been added, the relationship between slump and drum motor pressure is altered, and RSP 24 accordingly may adjust its calculations to account for these changes, or alternatively, discontinue automatically adding water to adjust slump after the addition of additive, and instead simply display slump, drum rotation, hydraulic pressure, flow, and/or temperature.

Once the current slump is substantially equal to the customer-specified or desired slump in block 68, the load is ready for delivery and control is passed to block 78. In block 78, the slump level of the product is captured and reported, as well as the time, location and amount of product delivered. The slump level can be captured and reported at any number of times during the process, as well as the time, location and amount of product delivered. Automatic mode 64 ends in block 80.

Figure 4:
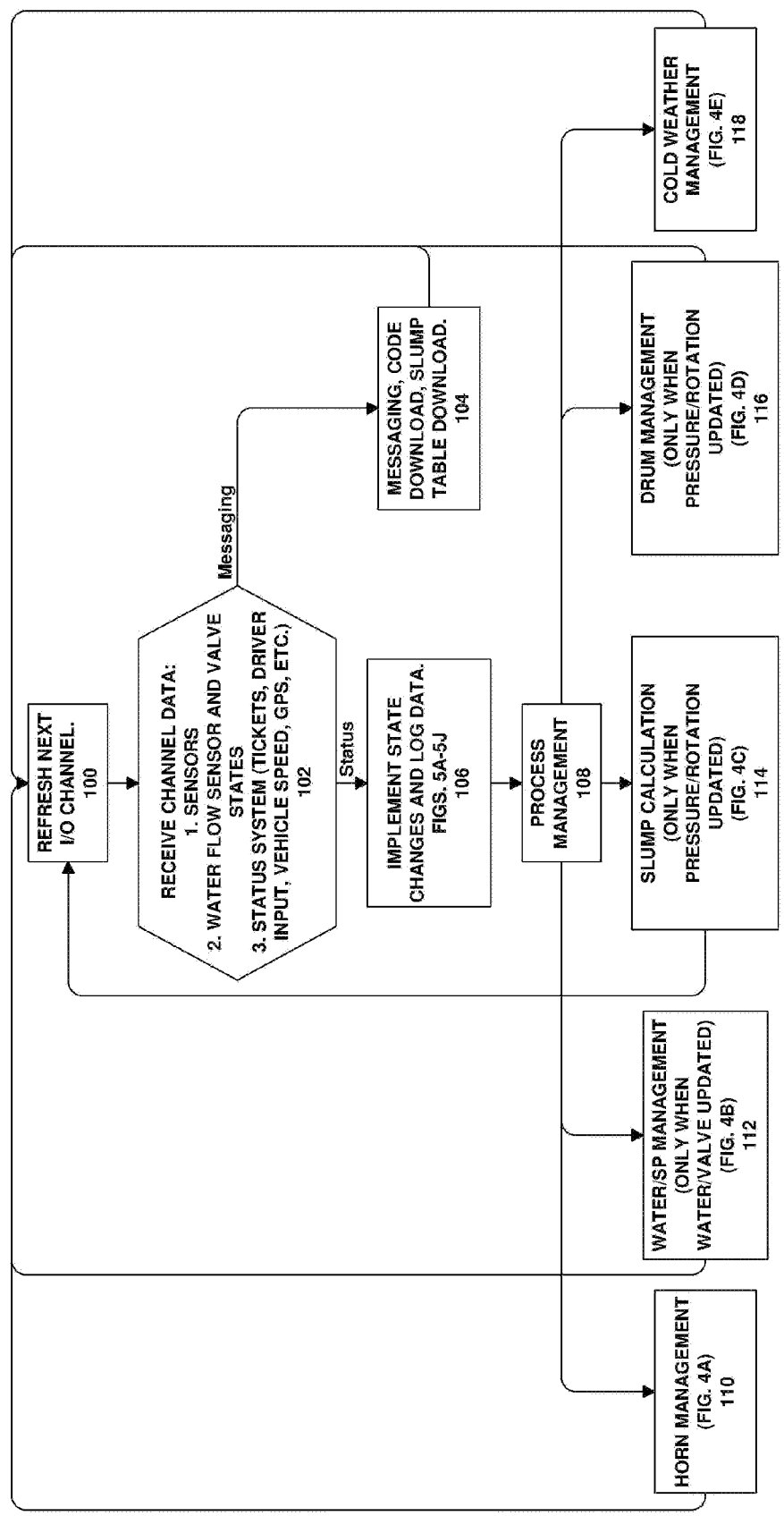
FIG. 4 is a flow chart of the detailed operation of the ready slump processor of FIG. 1.

Referring now to FIG. 4, a substantially more detailed embodiment of the present invention can be described. In this embodiment automatic handling of water and monitoring of water and chemical additive input is combined with tracking the process of delivery of concrete from a mixing plant to delivery truck to a job site and then through pouring at the job site.

FIG. 4 illustrates the top-level process for obtaining input and output information and responding to that information as part of process management and tracking. Information used by the system is received through a number of sensors, as illustrated in FIG. 1, through various input/output channels of the ready slump processor.

In a first step 100, information received on one of those channels is refreshed. Next in step 102, the channel data is received. Channel data may be pressure, rotation, temperature, tilt, and/or truck acceleration/deceleration sensor information, water flow sensor information and valve states, or communications to or requests for information from the vehicle status system 28, such as relating to tickets, driver inputs and feedback, manual controls, vehicle speed information, status system state information, GPS information, and other potential communications. Communications with the status system may include messaging communications requesting statistics for display on the status system or for delivery to the central dispatch center, or may include new software downloads or new slump lookup table downloads.

For messaging communications, code or slump table downloads, in step 104 the ready slump processor completes the appropriate processing, and then returns to step 100 to refresh the next channel. For other types of information, processing of the ready slump processor proceeds to step 106 where changes are implemented and data is logged, in accordance with the current state of the ready slump processor.

In addition to processing state changes, process management 108 by the ready slump processor involves other activities shown on FIG. 4. Specifically, process management may include management of the horn in step 110, management of water and chemical additive monitoring in step 112, management of slump calculations in step 114, and management of drum rotation tracking in step 116, and management of cold weather activity in step 118.

As noted in FIG. 4, water management and chemical additive monitoring is only performed when water or valve sensor information is updated, and slump calculations are only performed when pressure and rotation information is updated, and drum management in step 116 is only performed when pressure and rotation information is updated.

Figure 4A:
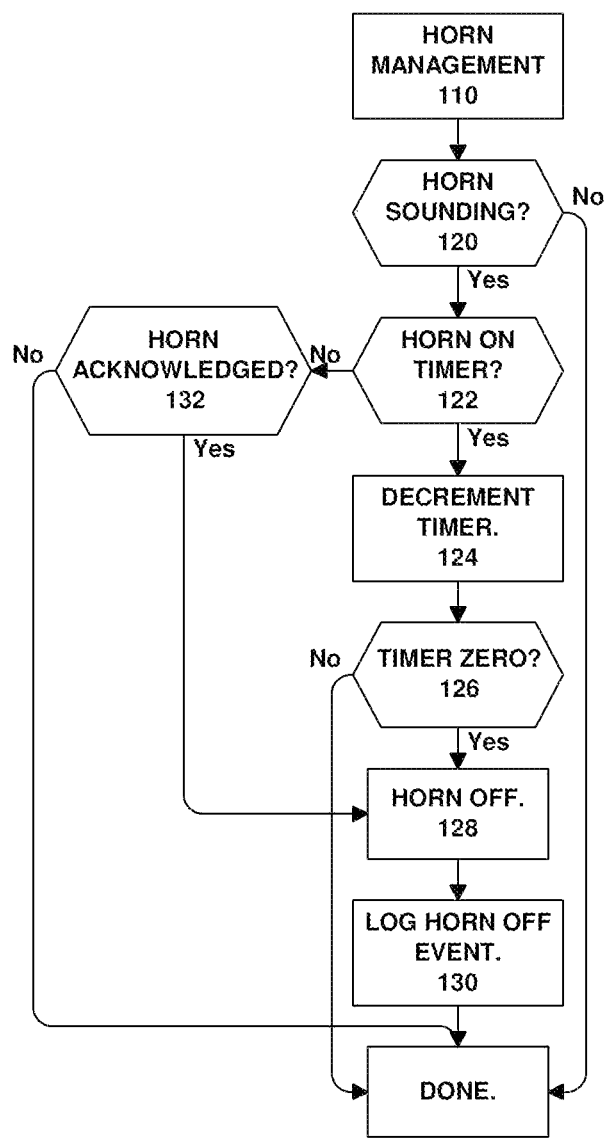
FIG. 4A is a flow chart of the management of the horn operation by the ready slump processor.

Referring now to FIG. 4A, horn management in step 110 can be explained. The horn of the ready slump processor is used to alert the operator of alarm conditions, and may be activated continuously until acknowledged, or for a programmed time period. If the horn of the ready slump processor is sounding in step 120, then it is determined in step 122 whether the horn is sounding for a specified time in response to a timer. Is so, then in step 124 the timer is decremented, and in step 126 it is determined whether the timer has reached zero. If the timer has reached zero, in step 128 the horn is turned off, and in step 130 the event of disabling the horn is logged. In step 122 if the horn is not responsive to a timer, then the ready slump processor determines in step 132 whether the horn has been acknowledged by the operator, typically through a command received from the status system. If the horn has been acknowledged in step 132, then processing continues to step 128 and the horn is turned off.

Figure 4B:
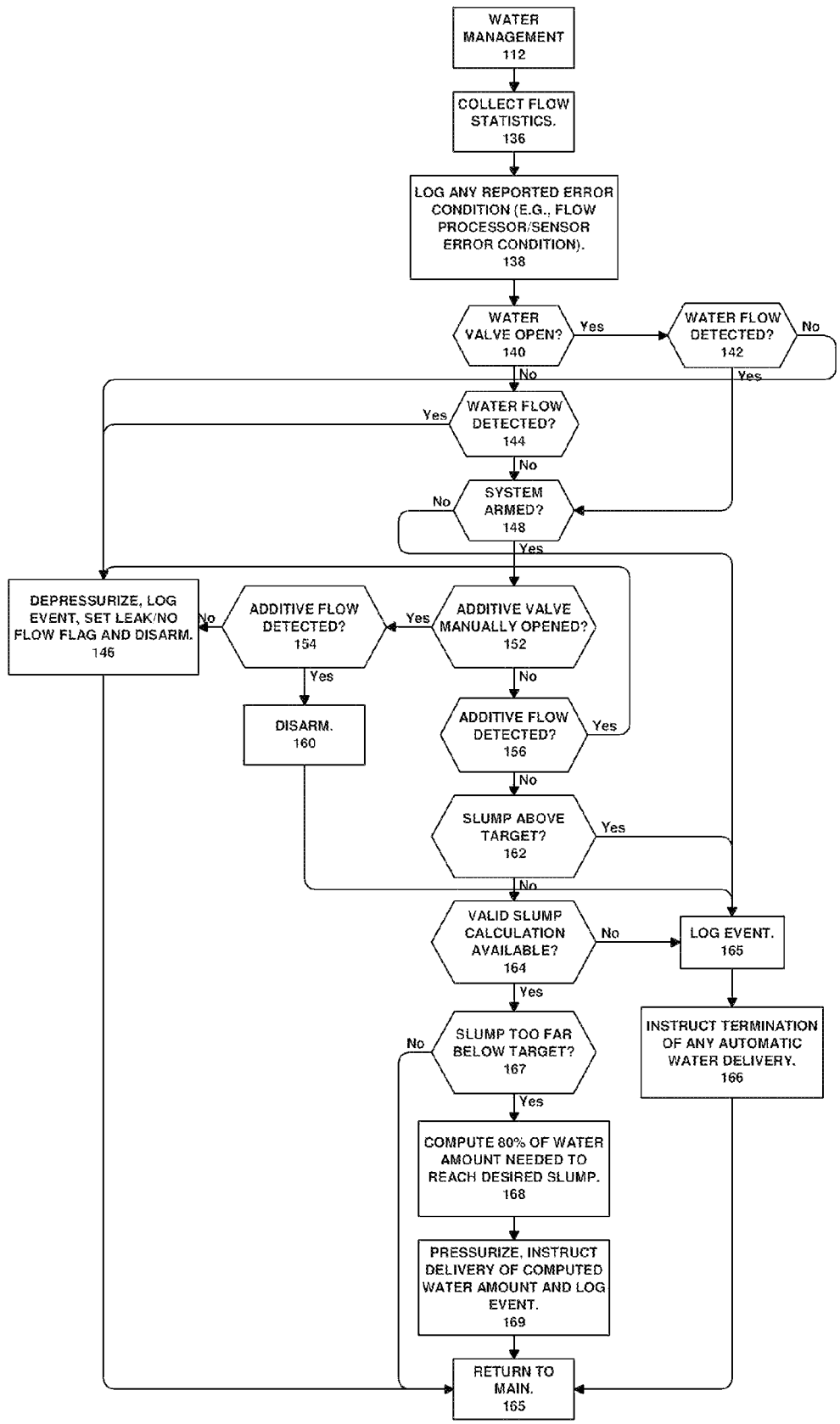
FIG. 4B is a flow chart of the management of the water delivery system by the ready slump processor.

Referring now to FIG. 4B, water management in step 112 can be explained. The water management process involves continuous collection of the flow statistics for both water and chemical additive, and, in step 136, collection of statistics on detected flows. In addition, error conditions reported by sensors or a processor responsible for controlling water or chemical additive flow are logged in step 138.

The water management routine also monitors for water leaks by passing through steps 140, 142 and 144. In step 140 it is determined whether the water valve is currently open, e.g., due to the water management processor adding water in response to a prior request for water, or a manual request for water by the operator (e.g., manually adding water to the load or cleaning the drum or truck after delivery). If the valve is open, then in step 142 it is determined whether water flow is being detected by the flow sensor. If the water valve is open and there is no detected water flow, then an error is occurring and processing continues to step 146 at which time the water tank is depressurized, an error event is logged, and a "no flow" flag is set to prevent any future automatic pressurization of the water tank. If water flow is detected in step 142, then processing continues to step 148.

Returning to step 140, if the water valve is not open, then in step 144 is determined whether water flow is nevertheless occurring. If so, then an error has occurred and processing again proceeds to step 146, the system is disarmed, the water delivery system is depressurized, a "leak" flag is set and an error event is logged.

If water flow is not detected in step 144, then processing continues to step 148. Processing continues past step 148 only if the system is armed. The water management system must be armed in accordance with various conditions discussed below, for water to be automatically added by the ready slump processor. If the system is not armed in step 148, then in step 166, any previously requested water addition is terminated.

If the system is armed, then in step 152 it is determined whether the chemical additive valve has been manually opened, e.g., due to the operator adding a chemical additive in order to make working with the concrete easier. If the valve is open, then in step 154 it is determined whether chemical additive flow is being detected by the flow sensor. If the chemical additive valve is open and there is no detected chemical additive flow, then an error is occurring and processing continues to step 146 at which time the chemical additive tank is depressurized, an error event is logged, and a "no flow" flag is set to prevent any future automatic pressurization of the chemical additive tank. If chemical additive flow is detected in step 154, then processing continues to step 160. In step 160 the amount of chemical additive added is logged. If the additive delivered is not expected or contrary to recipe, or the water management otherwise can no longer proceed, the system is disarmed and the process then moves to step block 166. whereby termination of automatic water delivery is executed. If the additive delivered is according to recipe, or the RSP includes programming to continue water management with the additive included, then the system will not be disarmed.

Returning to step 152, if the chemical additive valve is not open, then in step 156 it is determined whether chemical additive flow is nevertheless occurring. If so, then an error has occurred and processing again proceeds to step 146, the system is disarmed, the chemical additive delivery system is depressurized, a "leak" flag is set and an error event is logged. If there is no chemical additive flow then the process moves to block 162.

If the above tests are passed, then processing arrives at step 162, and it is determined whether the current slump is above target. If the slump is equal to or above target, the current slump characteristics are logged in step 165, and the process moves to block 166. If the current slump is below target the process moves to step 164, it is then determined whether there is a valid slump calculation available. If there is a valid slump calculation available, then in the process moves to block 167. If there is not a valid slump calculation, then no further processing takes place and the water management process proceeds to step 165. In step 167, it is determined whether the slump is too far below the target value. If so, processing continues from step 167 to step 168, in which a specified percentage, e.g. 80%, of the water needed to reach the desired slump is computed, utilizing in the slump tables and computations discussed herein. (The 80% parameter, and many others used by the ready slump processor, are adjustable via a parameter table stored by the ready slump processor.) Then, in step 169, the water tank is pressurized and an instruction is generated requesting delivery of the computed water amount, and the event is logged.

Figure 4C:
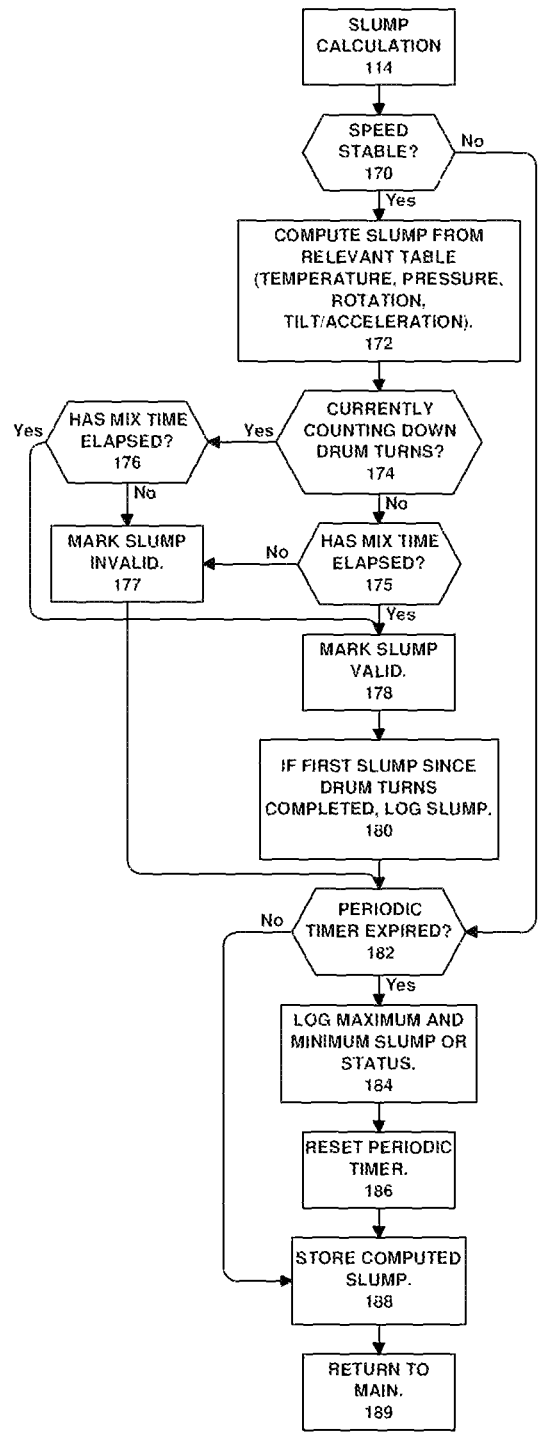
FIG. 4C is a flow chart of the management of slump calculations by the ready slump processor.

Referring now to FIG. 4C, slump calculation management in step 114 can be explained. Some calculations will only proceed if the drum speed is stable. The drum speed may be unstable if the operator has increased the drum speed for mixing purposes, or if changes in the vehicle speed or transmission shifting has occurred recently. The drum speed must be stable for valid slump calculation to be generated. In step 170, therefore, the drum speed stability is evaluated, by analyzing stored drum rotation information collected as described below with reference to FIG. 4D. If the drum speed is stable, then in step 172 a slump calculation is made. Slump calculations in step 172 are performed utilizing an empirically generated lookup table identifying concrete slump as a function of measured hydraulic pressure of the drum drive motor and calculating offsets and compensation based on drum rotational speed, type of equipment, load size and truck tilt/acceleration/deceleration.

One example of slump calculation is described herein; in this example, at a stable drum speed (as managed in FIG. 4D, below) the average drum speed and pressure are used to compute slump, by reference to a lookup table that identifies, at a reference drum speed (e.g., three rpm), the slump value associated with each of a wide range of hydraulic pressure measurements.

It will be noted that the relationship between pressure and drum speed varies non-linearly; therefore, to accurately compute slump at a different drum speed than the reference speed of the table, a compensation must be performed. While the mixing performed in transit from the plant is often at a relatively stable speed of three to six rpm, in some situations much faster mixing speeds may be used. For example, in some plants a truck, after loading, moves to a "slump rack", where the truck is used to perform some portion of batch processing. Frequently, at the slump rack, the truck will perform high speed mixing, then adjust the load, then perform more high speed mixing and finally slow down the drum to travel speed and depart. If the slump calculations in RSP 24 are tied to a specific drum speed, the RSP 24 will have difficulty computing slump during this initial handling, which can require manual management of the load by the driver, manual addition of water, etc. and can lead to overwatering or other difficulties. To avoid such manual management, RSP 24 needs to be able to compute slump at widely varying drum speeds, potentially including speeds above ten rpm, i.e., much faster than the reference speed for the lookup table.

In order to support such higher mixing rates, an rpm compensation may be utilized. For this computation, each truck is assigned a calibrated rpm factor (RPMF), which represents the decrease in average hydraulic pressure caused by an increase in drum speed of 1 rpm. The RPMF for a given concrete truck is typically between 4 and 10, but the range may be different for different trucks and mixtures. RPMF is used to adjust the average hydraulic pressure measured from the drum at speeds other than the reference pressure of the table. In this way, the RSP 24 can compute the average pressure that would be measured at the reference drum speed, and this average pressure can then be used with the stored table to determine slump.

Where the reference pressure of the table in the RSP 24 is 3 rpm, the relationship between hydraulic pressure and drum speed is approximately linear over the range from 0 to 6 rpm. Thus, a drum speed increase from 3 to 4 rpm decreases average pressure by approximately 1*RPMF and a drum speed increase from 3 to 5 rpm decreases average pressure by approximately 2*RPMF. A drum speed decrease from 3 to 2 rpm increases average pressure by approximately 1*RPMF.

Because there is a nonlinear relationship between drum speed and pressure, this linear approximation of average pressure change is accurate only at speeds near to the reference speed of 3 rpm. At higher drum speeds, the RPMF increases. For the purposes of slump calculation, the increase in the RPMF is handled in a piecewise linear fashion. Specifically, at drum speeds from 6 to 10 rpm, the RPMF is doubled and above 10 rpm, the RPMF is quadrupled.

Thus, for example, if the current average drum speed is 12 rpm, then the increase in average pressure that would be expected at a drum speed of 2 rpm is computed as follows:

For the 2 rpm decrease from 12 to 10 rpm, pressure increases 2*4*RPMF

For the 4 rpm decrease from 10 to 6 rpm, pressure increases 4*2*RPMF

For the 3 rpm decrease from 6 to 3 rpm, pressure increases 3*RPMF

Total=19*RPMF

If the RPMF for the particular truck is 6 and the measured pressure at 12 rpm is 1500, then the pressure decrease to be expected would be 19*RPMF=114, and the expected pressure at 3 rpm would be 1500−114=1386.

As a second example, if the current average drum speed is 1 rpm, then the decrease in average pressure that would be expected at a drum speed of 3 rpm is computed as follows:

For the 2 rpm increase from 2 to 3 rpm, pressure decreases by 2*RPMF

If the RPMF for the particular truck is 8 and the measured pressure at 2 rpm is 1200, then the pressure increase to be expected would be RPMF=8, and the expected pressure at 3 rpm would be 1200+8=1216.

The expected pressure at 3 rpm, computed in this manner, can then be used with the pressure/slump table in RSP 24 to identify the current slump.

As noted, the rpm factor RPMF is different from one truck to another. This is for a variety of reasons including the buildup in the drum of the truck, fin shape, hydraulic efficiency variation, and others. Calibrating and re-calibrating the RPMF for each truck in a fleet could be a burdensome process. However, the need for such may be reduced by the use of a self calibration process, based upon a theory of slump continuity. The theory of slump continuity is that, over a short period of time, absent extraneous factors such as addition of water or mixture, slump remains relatively constant even if drum speed changes. Therefore the rpm compensation described above may be tested whenever there is a drum speed change, by comparing an observed change in average pressure caused by the drum speed change, to the predicted change in average pressure. If the predicted pressure change is erroneous, the rpm factor RMPF may be adjusted.

Drum speed changes may occur at various times in a typical delivery cycle, however, one common time that there is a drum speed change is during the load process and slump rack premixing described above. Specifically, at the slump rack the truck will perform high speed mixing, then adjust the load, then more high speed mixing, and finally slow down the drum to a travel speed of 3-6 rpm, and depart. Thus, this process presents an opportunity to observe a transition from a high drum speed to a low drum speed, and compare the computed pressure measurement change to the actual pressure measurement change for that transition.

The self calibration proceeds as follows: when a drum speed change from a higher to a lower speed occurs, the average pressure at the higher speed (before the speed change) is used to compute a predicted pressure at 3 rpm, and the average pressure at the lower speed (after the speed change) is similarly used to compute a predicted pressure at 3 rpm, in each case using the process described above. If the predicted 3 rpm pressure derived from the higher speed is larger than the predicted 3 rpm pressure derived from the lower speed, this indicates that the RPMF overestimating the pressure increase caused by speed reduction, and the RPMF is reduced so that the two predicted 3 rpm pressures are equal. If the predicted 3 rpm pressure derived from the lower speed is larger than the predicted 3 rpm pressure derived from the higher speed, this indicates that the RPMF is underestimating the pressure increase caused by speed reduction, and the RPMF is increased so that two predicted 3 rpm pressures are equal.

There are several safety limits applied to this self calibration process, to ensure stability. First, the maximum amount that the self calibration can adjust the rpm factor is plus or minus 25% of the default value programmed for the truck. If greater adjustments are required a technician must alter the default value or permit larger adjustments. Furthermore, the maximum change to the rpm factor RPMF that the self calibration can implement during a single delivery cycle is 0.25.

Returning now to FIG. 4C, after computing a slump value in step 172, in step 174 it is determined whether a mixing process is currently underway. In a mixing process, as discussed below, the drum must be turned a threshold number of times and for a predetermined length of time before the concrete in the drum will be considered fully mixed. If the ready slump processor is currently counting time or drum turns (step 175 or 176), then processing proceeds to step 177 and the computed slump value is marked invalid, because the concrete is not yet considered fully mixed. If there is no current mixing operation processing continues to step 178 and the current slump measurement is marked valid, and then to step 180 where it is determined whether the current slump reading is the first slump reading generated since a mixing operation was completed. If so, then the current slump reading is logged so that the log will reflect the first slump reading following mixing.

Following step 177 or step 180, or following step 170 if the drum speed is not stable, in step 182 a periodic timer is evaluated. This periodic timer is used to periodically log slump readings, whether or not these slump ratings are valid. The period of the timer may be for example one minute or four minutes. When the periodic timer expires, processing continues from step 182 to step 184, and the maximum and minimum slump values read during the previous period are logged, and/or the status of the slump calculations is logged.

Thereafter in step 186 the periodic timer is reset. Whether or not slump readings are logged in step 184, in step 188 any computed slump measurement is stored within the ready slump processor for later use by other processing steps, and the slump management process returns.

Figure 4D:
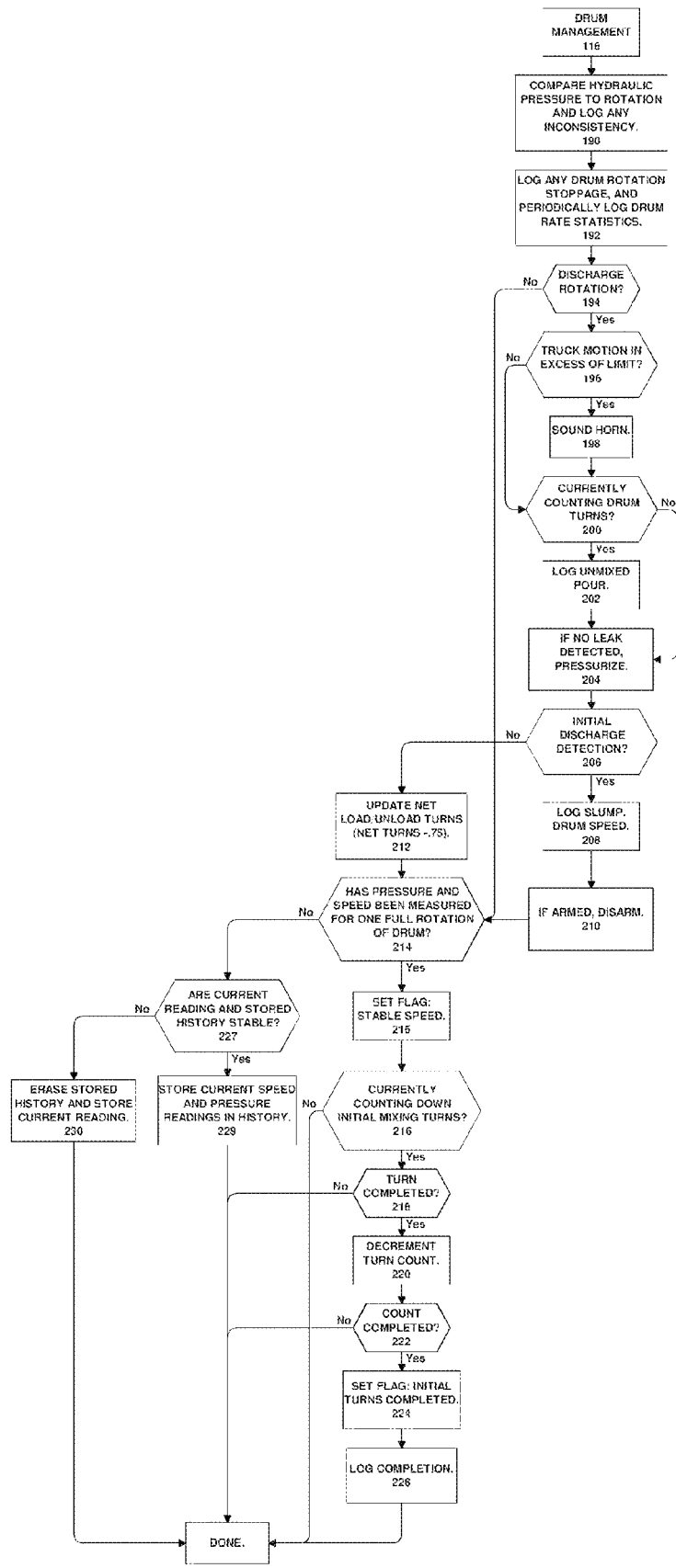
FIG. 4D is a flow chart of the drum management performed by the ready slump processor.

Referring now to FIG. 4D, drum management of step 116 can be explained. Drum management includes a step 190, in which the most recently measured hydraulic pressure of the drum motor is compared to the current rotation rate, and any inconsistency between the two is logged. This step causes the ready slump processor to capture sensor errors or motor errors. In step 192 a log entry is made in the event of any drum rotation stoppage, so that the log will reflect each time the drum rotation terminates, which documents adequate or inadequate mixing of concrete.

In step 194 of the drum management process, rotation of the drum in discharge direction is detected. If there is discharge rotation, then in step 196, the current truck speed is evaluated. If the truck is moving at a speed in excess of a limit (typically the truck would not move faster than one or two mph during a pour operation), then the discharge is likely unintended, and in step 198 the horn is sounded indicating that a discharge operation is being performed inappropriately.

Assuming the truck is not moving during the discharge, then a second test is performed in step 200, to determine whether concrete mixing is currently underway, i.e., whether the ready slump processor is currently counting time or drum turns. If so, then in step 202, a log entry is generated indicating an unmixed pour indicating that the concrete being poured appears to have been incompletely mixed.

In any case where discharge rotation is detected, in step 204 the water system is pressurized (assuming a leak has not been previously flagged) so that water may be used for cleaning of the concrete truck.

After step 204, it is determined whether the current discharge rotation event is the first discharge detected in the current delivery process. If, in step 206, the current discharge is the first discharge detected, then in step 208 the current slump calculations and current drum speed are logged. Also, in step 210, the water delivery system is disarmed so that water management will be discontinued, as discussed above with reference to FIG. 4B. If the current discharge is not the first discharge, then in step 212 the net load and unload turns computed by the ready slump processor is updated.

In the typical initial condition of a pour, the drum has been mixing concrete by rotating in the charging direction for a substantial number of turns. In this condition, number of turns of discharge rotation are required to begin discharging concrete. (Typically three-quarters of a turn are required to begin discharge on rear-loading trucks, but a potentially different number of turns may be required on some trucks, particularly front loading trucks.) Thus, when discharge rotation begins from this initial condition, the ready slump processor subtracts, e.g., three-quarters of a turn from the detected number of discharge turns, to compute the amount of concrete discharged.

It will be appreciated that, after an initial discharge, the operator may discontinue discharge temporarily, e.g., to move from one pour location to another at the job site. In such an event, typically the drum will be reversed, and again rotate in the charge direction. In such a situation, the ready slump processor tracks the amount of rotation in the charge direction after an initial discharge. When the drum again begins rotating in the discharge direction for a subsequent discharge, then the amount of immediately prior rotation in the charge direction (maximum three-quarters of a turn) is subtracted from the number of turns of discharge rotation, to compute the amount of concrete discharged. In this way, the ready slump processor arrives at an accurate calculation of the amount of concrete discharged by the drum. The net turns operation noted in step 212 will occur each time the discharge rotation is detected, so that a total of the amount of concrete discharge can be generated that is reflective of each discharge rotation performed by the drum. As an alternative or in addition to the computations in FIG. 212, the other sensors available to the ready slump processor 24, including the optional load cell 51 seen in FIG. 1, may be used to further enhance the computation of the amount of concrete delivered from the truck (concrete on the ground). Specifically, the change in weight measured by the load cell may be used as a measure of the concrete delivered. Furthermore, the temperature sensor may be used to detect the volume of concrete in the drum by detecting the temperature change indicative of immersion of the sensor in the hot concrete and the emergence of the sensor from the hot concrete as the drum is rotated. The fraction of a turn during which elevated temperature is detected is another potential measure of the volume of concrete in the drum.

After the steps noted above, drum management proceeds to step 214, in which the drum speed stability is evaluated. In step 214, it is determined whether the pressure and speed of the drum hydraulic motor have been measured for a full drum rotation. If so, then in step 215 a flag is set indicating that the current rotation speed is stable. Following this step, in step 216 it is determined whether initial mixing turns are being counted by the ready slump processor. If so, then in step 218 it is determined whether a turn has been completed. If a turn has been completed then in step 220 the turn count is decremented and in step 222 it is determined whether the current turn count has reached the number needed for initial mixing. If initial mixing has been completed then in step 224 a flag is set to indicate that the initial turns been completed, and in step 226 completion of mixing is logged.

If in step 214 pressure and speed have not been measured for a full rotation of the drum, then in step 227 the current pressure and speed measurements are compared to stored pressure and speed measurements for the current drum rotation, to determine if pressure and speed are stable. If the pressure and speed are stable, then the current speed and pressure readings are stored in the history (step 229) such that pressure and speed readings will continue to accumulate until a full drum rotation has been completed. If, however, the current drum pressure and speed measurements are not stable as compared to prior measurements for the same drum rotation, then the drum rotation speed or pressure are not stable, and in step 230 the stored pressure and speed measurements are erased, and the current reading is stored, so that the current reading may be compared to future readings to attempt to accumulate a new full drum rotation of pressure and speed measurements that are stable and usable for a slump measurement. It has been found that accurate slump measurement is not only dependent upon rotation speed as well as pressure, but that stable drum speed is needed for slump measurement accuracy. Thus, the steps in FIG. 4D maintain accuracy of measurement.

Figure 5:
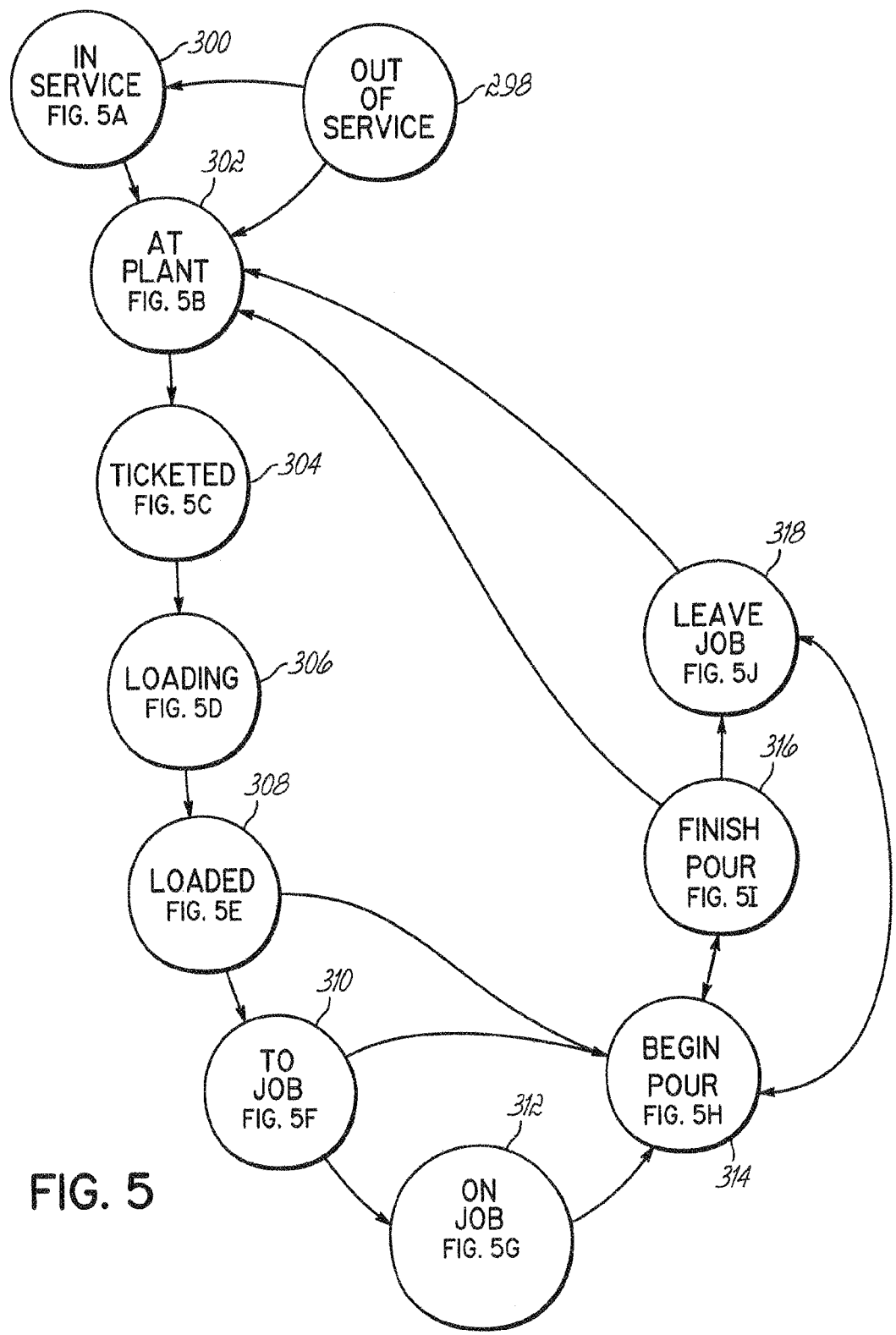
FIG. 5 is a state diagram showing the states of the status system and ready slump processor.

Referring now to FIG. 5, the states of the ready slump processor are illustrated. These states include an out_of_service state 298, in_service state 300, at_plant state 302, ticketed state 304, loading state 306, loaded state 308, to_job state 310, on_job state 312, begin_pour state 314, finish_pour state 316, and leave_job state 318. The out of service state is a temporary state of the status system that will exist when it is first initiated, and the status system will transition from that state to the in_service state or at_plant state based upon conditions set by the status system. The in_service state is a similar initial state of operation, indicating that the truck is currently in service and available for a concrete delivery cycle. The at_plant state 302 is a state indicating that the truck is at the plant, but has not yet been loaded for concrete or given a delivery ticket. The ticketed state 304 indicates that the concrete truck has been given a delivery ticket (order), but has not yet been loaded. (A delivery truck may also receive a job ticket when loading, loaded, or even when en route to a job site.) A loading state 306 indicates that the truck is currently loading with concrete. The loaded state 308 indicates that the truck has been loaded with concrete. The to_job state 310 indicates that the truck is on route to its delivery site. The on_job state 312 indicates the concrete truck is at the delivery site. The begin_pour state 314 indicates that the concrete truck has begun pouring concrete at the job site.

It will be noted that a transition may be made from the loaded state or the to_job state directly to the begin_pour state, in the event that the status system does not properly identify the departure of the truck from the plant and the arrival of the truck at the job site (such as if the job site is very close to the plant). The finish_pour state 316 indicates that the concrete truck has finished pouring concrete at the job site. The leave_job state 318 indicates the concrete truck has left the job site after a pour.

It will be noted that transition may occur from the begin_pour state directly to the leave_job state in the circumstance that the concrete truck leaves the job site before completely emptying its concrete load. It will also be noted that the ready slump processor can return to the begin_pour state from the finish_pour state or the leave_job state in the event that the concrete truck returns to the job site or recommences pouring concrete at the job site. Finally, it will be noted that a transition may occur from either the finish_pour state or the leave_job state to the at_plant state in the event that the concrete truck returns to the plant. The concrete truck may not empty its entire load of concrete before returning to the plant, and this circumstance is allowed by the ready slump processor. Furthermore, as will be discussed in more detail below, the truck may discharge a partial portion of its load while at the plant without transitioning to the begin pour state, which may occur if a slump test is being performed or if a partial portion of the concrete in the truck is being discharged in order to add additional concrete to correct the slump of the concrete in the drum.

FIGS. 6A-6F illustrate embodiments of a cold weather operation water evacuation system. When the temperature falls below freezing it is possible that water in the supply lines may freeze and expand, thus damaging the lines. Thus it is necessary to evacuate the water from the supply lines when the temperature falls below freezing.

Figure 6A:
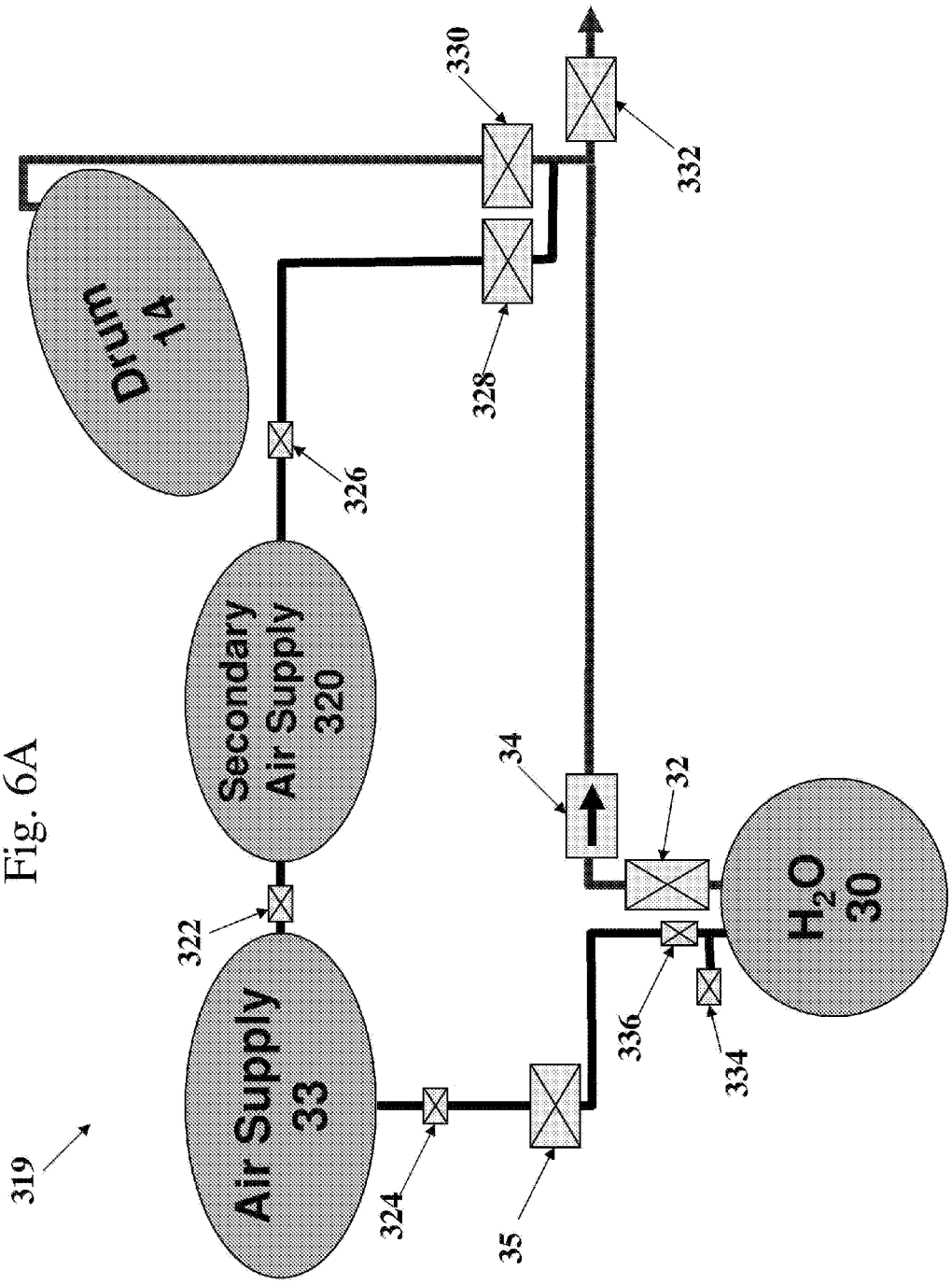
FIGS. 6A, 6B, 6C, 6D, 6E and 6F illustrate the six types water evacuation systems for cold weather operation.

FIG. 6A illustrates an embodiment of a cold weather operation water evacuation system 319 in which a pneumatic purge method is utilized for the evacuation of water from the supply lines. An air supply 33 is often available on a mixing truck, but may only be pressurized if the truck engine is running; this embodiment uses a secondary air supply 320. Due to the use of two air supplies, a safety hold back valve 322 is used to regulate the pressure between the air supplies. Also, regulators 324/326 can be used between the air supplies and the rest of the system. The regulators will maintain a certain pressure throughout the lines, i.e. 50 or 65 p.s.i. There are a multitude of valves used in the water evacuation system. The air valve 35 controls the pressurization of the water supply. There is a valve between the water supply 30 and the air valve 35, which opens and closes the line allowing for pressurization and depressurization of the water supply 30, an example of a valve used could be a Quick exhaust type valve 336. A safety pop-off valve 334 insures that the pressure in the water supply 30 stays below a predetermined level, i.e. 60 p.s.i. A water valve 32 allows water to flow into the water lines. Flow meter 34 tracks the amount of water that flows through the lines. The purge valve 328 releases air into the lines enabling the evacuation of water from the lines, pushing the water back into the water supply 30 without depressurization of the tank 30. The drum valve 330 allows water to flow into the drum, and can be controlled by the RSP 24 in order to modify the slump characteristics. The hose valve 332 allows water to flow into a hose.

Figure 6B:
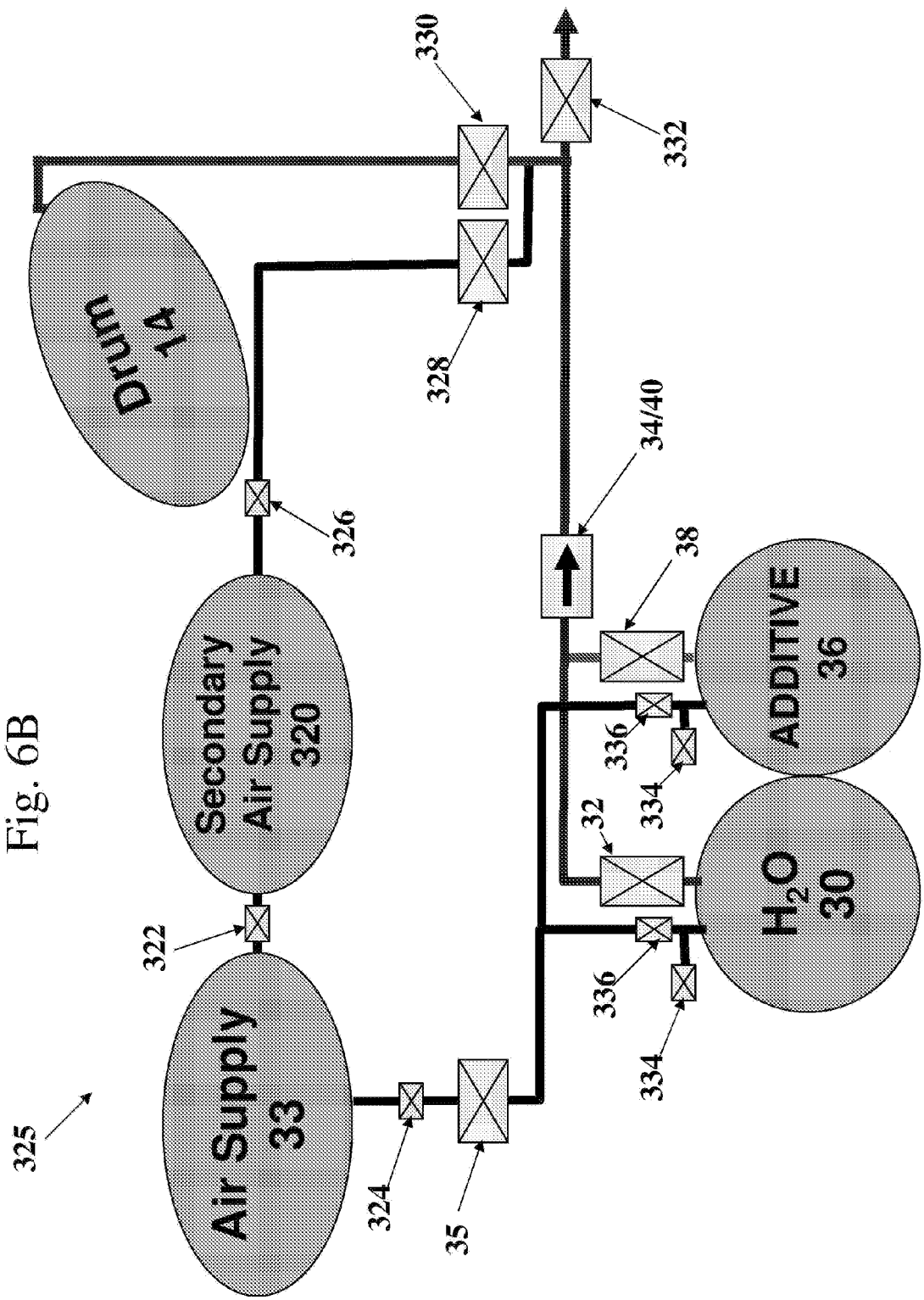

The embodiment 325 of FIG. 6B is similar to that of 6A with the exception of a chemical additive supply 36. The chemical additive supply 36 further includes a Quick exhaust valve 337, a safety pop-off valve 335, and a chemical additive valve 38. The flow meter 34/40 can be used to track the flow of both chemical additive and water through the lines. It should be noted that in the event that chemical additive is used the lines would first be flushed with water before purging the lines with air.

Figure 6C:
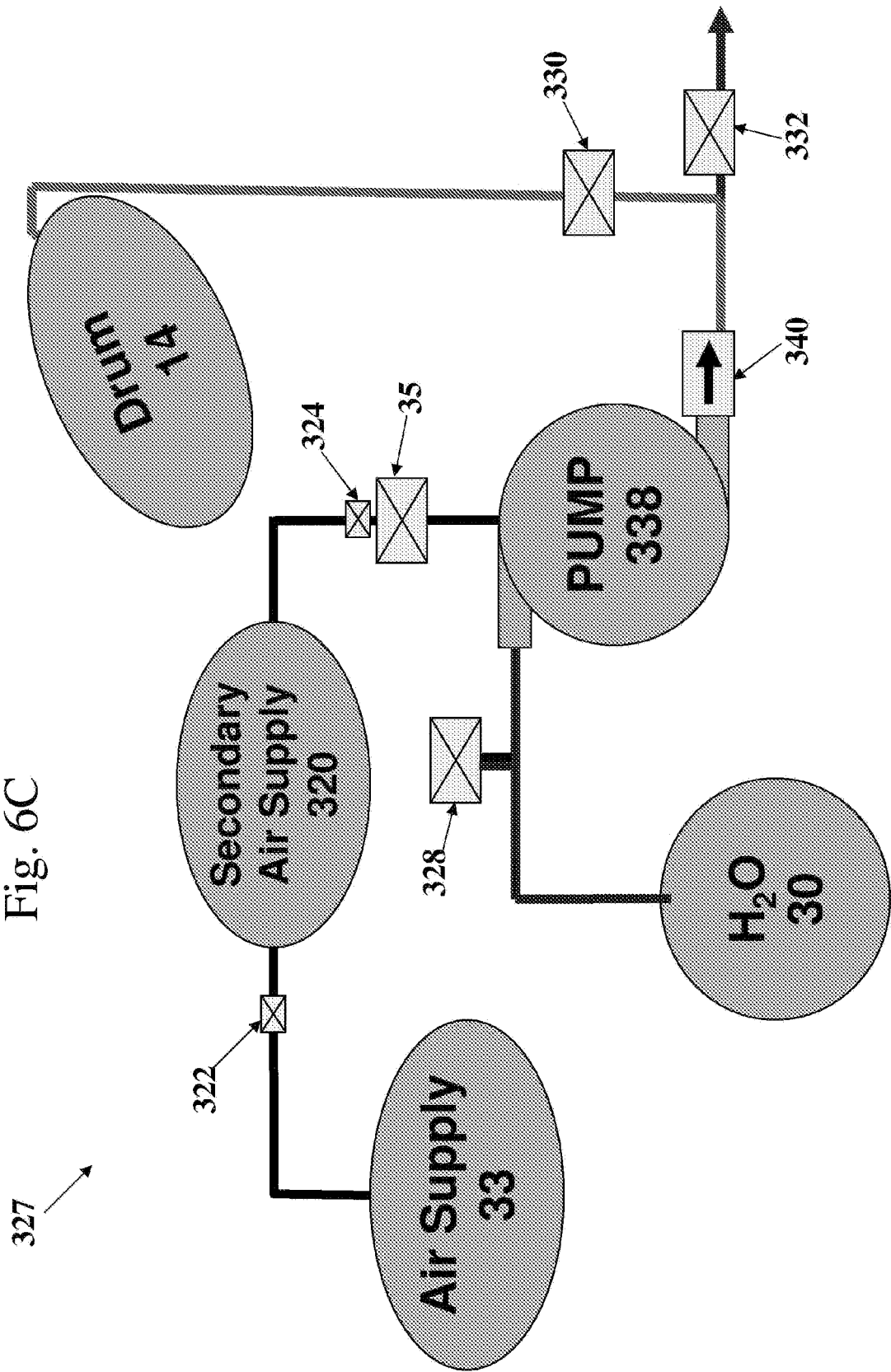

FIG. 6C illustrates an embodiment 327 in which a pump 338 is used to deliver fluid throughout the system. In this embodiment water is evacuated from the delivery lines back into the drum 14. The purge valve 328 opens causing the pump 338 to push air through the water delivery line into the drum 14. The drum valve 330 closes before the air valve 35 opens allowing the pump 338 to build pressure in the delivery line. The drum valve 330 then opens; the pump 338 pushes air through the line forcing the remaining water into the drum 14.

Figure 6D:
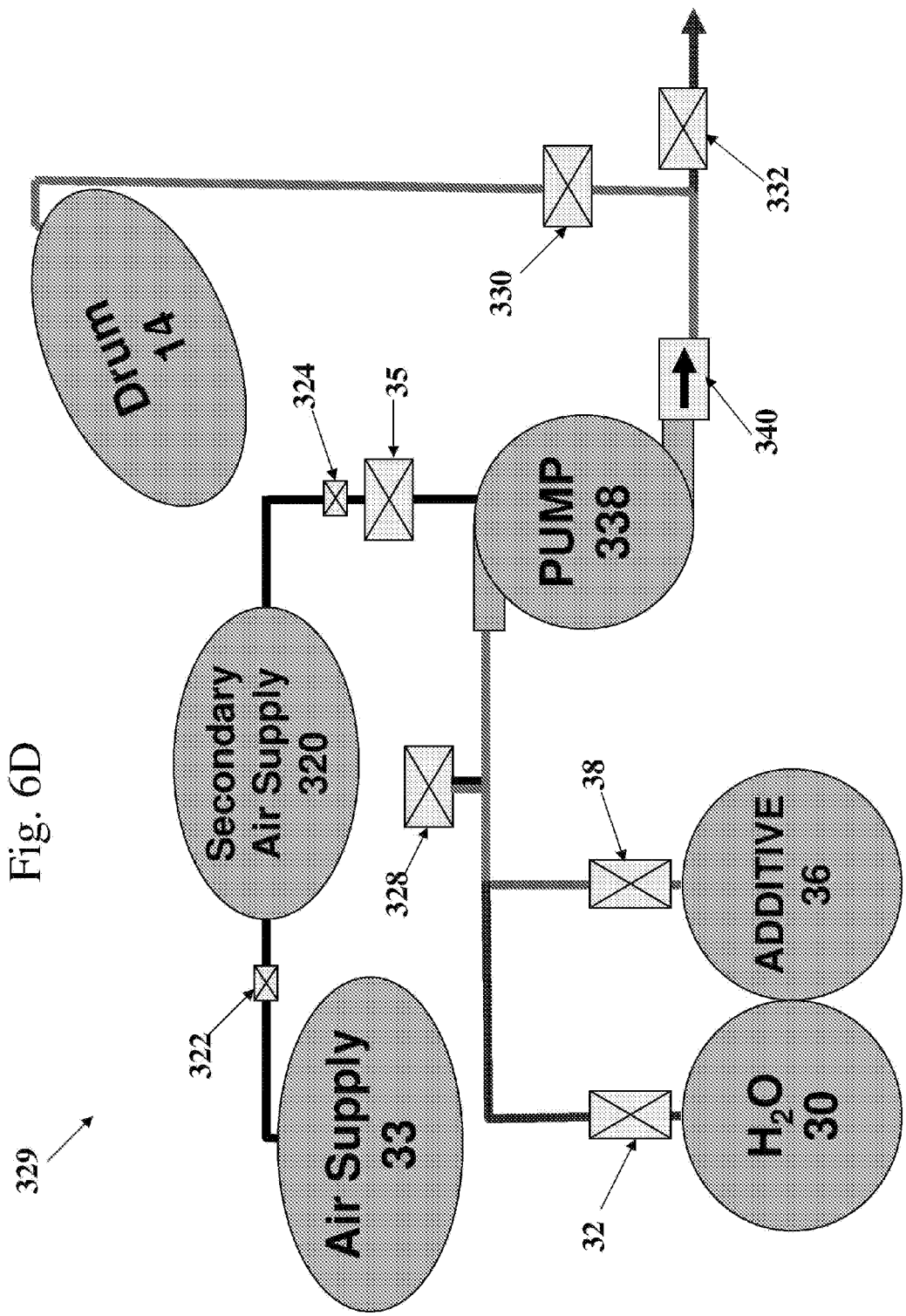

The embodiment 329 of FIG. 6D is similar to that of 6C with the exception of a chemical additive supply 36. The chemical additive supply 36 further includes a chemical additive valve 38. In the event that chemical additive is used, the delivery lines will be flushed with water prior to evacuation of the lines with air. The purge valve 328 opens and the water valve 32 closes causing the pump 338 to push air through the water delivery line into the drum 14. The drum valve 330 closes before the air valve 35 opens allowing the pump 338 to build pressure in the delivery line. The drum valve 330 then opens; the pump 338 pushes air through the line forcing the remaining water into the drum 14. This process can occur after every water or additive delivery or can be performed manually via a hand switch.

Figure 6E:
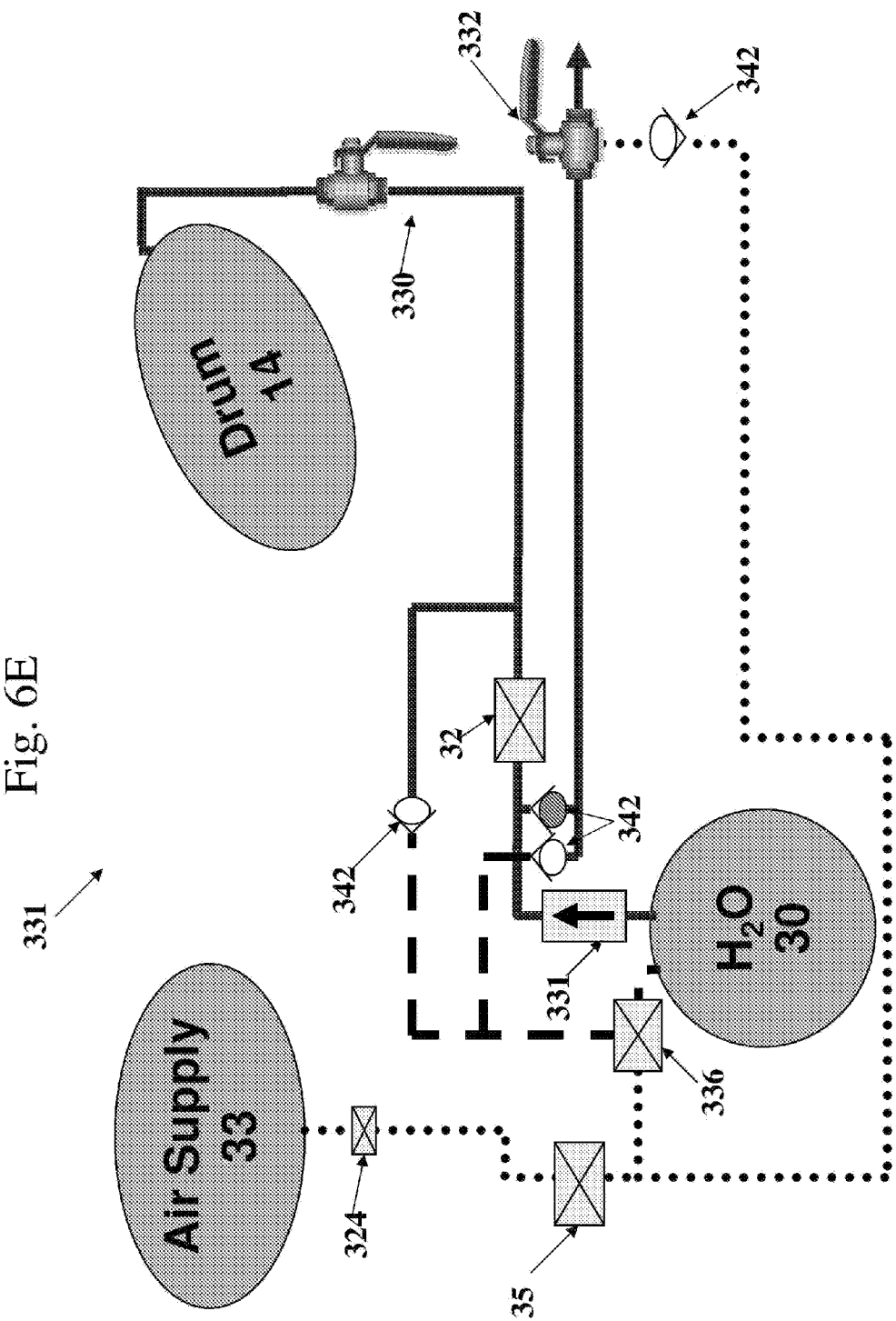

The embodiment 331 of FIG. 6E is an illustration of a water evacuation system in which the evacuation can occur while the water supply 30 is depressurized. First, water is evacuated from the horizontal portion of the delivery line back into the drum 14. When the water tank 30 is depressurized, the Quick exhaust valve 336 exhausts stored air pressure into the water delivery line via check valve 342. This air pressure forces remaining water into the mixing drum 14. Check valves 342 are used to insure the flow direction of the air pressure that evacuates the line. After air pressure is depleted the water valve 32 opens for a period of time to allow remaining water to drain back into the water tank 30. Water can then be evacuated from the rest of the delivery lines. The manual drum valve 330 is closed, and then the water tank 30 is depressurized. A manual valve 332 is used to shut off hose water and to port air pressure from the water tank pneumatic supply into the hose line. This insures the check valve 342 remains closed and that the hose line will not refill with water when the water tank 30 is pressurized.

Figure 6F:
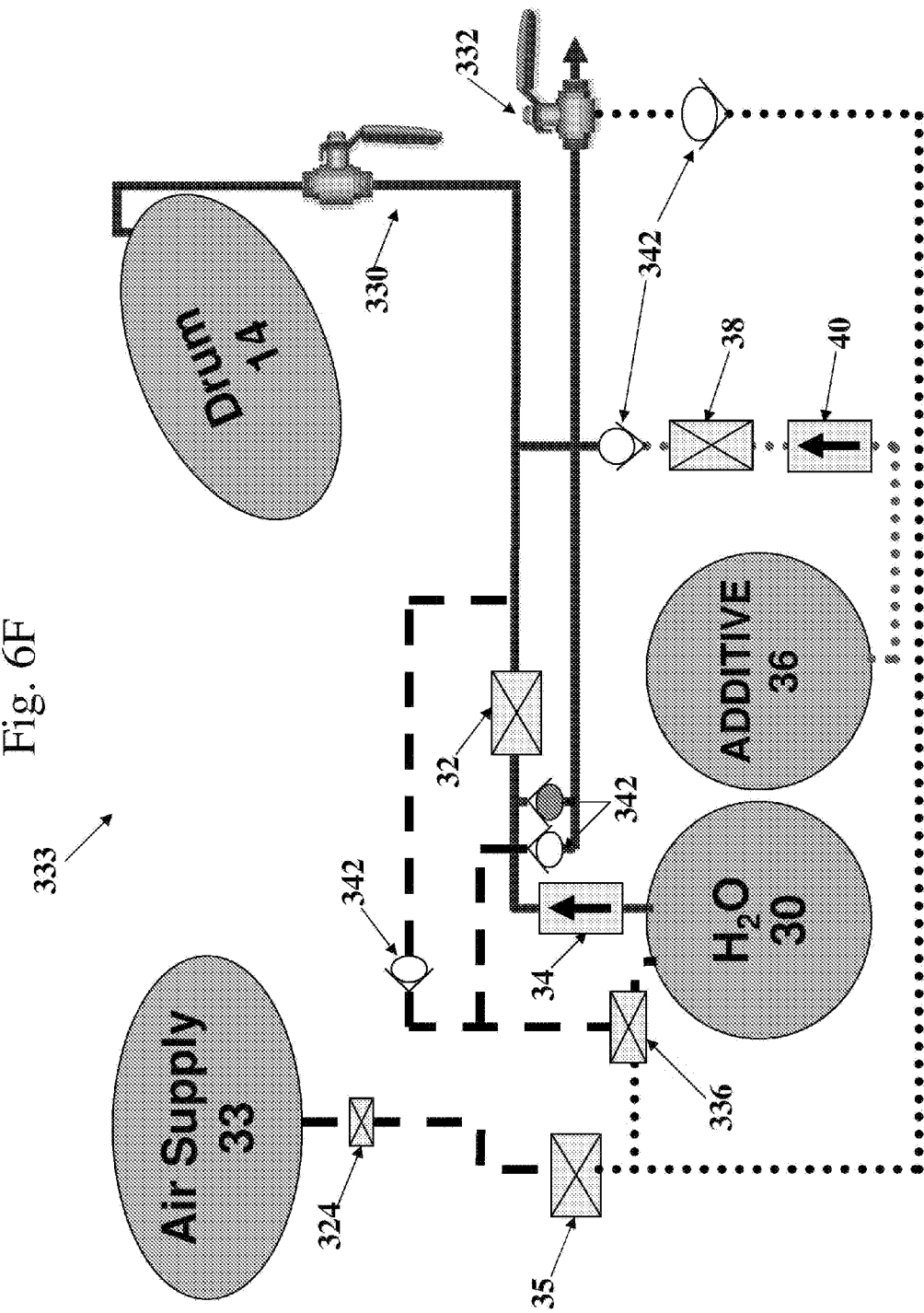

The embodiment 333 of FIG. 6F is similar to that of 6E with the exception of a chemical additive supply 36. The chemical additive supply 36 further includes a chemical additive valve 38, as well as a separate flow meter for the chemical additive. In the event that chemical additive is used, the delivery lines will be flushed with water prior to evacuation of the lines with air. It should be noted that in this embodiment there is a separate flow meter for the water and the chemical additive.

Referring now to FIG. 7A, an admixture dispenser system (ADS) 400 can be used to administer one or more chemical additives. The ADS could be capable of dispensing a plurality of chemical additives, in addition to water, on a ready mix truck. FIG. 7A is an example of one possible embodiment, it should be noted that there could be many such configurations of an admixture dispenser system. The containers of the chemical additives 402 can be attached to the intake manifold 406 via the intake valves 404. The intake manifold 406 could allow for the chemical additives to be added simultaneously as a mixture, in series (one after the other) or one additive at a time. Either the RSP 24 or the operator of the vehicle can control the flow of the chemical additive via the intake valves 404. Communication between the intake valves and the RSP 24 could verify that the correct amount of additive had been added to the mixture.

The admixture containers 402 may include level sensing instruments coupled to RSP 24 to permit RSP 24 to determine the amount of admixture contained in or dispensed from the containers 402

The containers 402 may take a variety of forms. They may be fixed tanks, coupled to external pumps for filling and emptying. The containers may disposable, and be punctured upon installation to permit emptying. The containers may be couplable to mechanical systems to permit dispensing of the mixture therein, e.g., the container may be in the form of a barrel, including a plunger therein, driven by a plunger drive in the manner of a syringe to dispense mixture from the container. Withdrawal of the plunger could be used to facilitate filling of the container in the same manner as is used on a syringe, obviating the need for a pump. Alternatively, the containers 402 may be collapsible, in which case the container is compressed by an external mechanical system to dispense mixture therefrom. The external mechanical system may comprise a tank into which the container is installed, which may be pressurized by pressurized air from the vehicle to collapse the container.

As noted, the admixture containers could include chemical additives of any type as specified by a cement or additive manufacturer, or may in addition or alternatively include colorant.

Identification tags 408 could be required on the containers of chemical additive. The identification tags 408 could be in the form of RFID or bar coding. The tags could be used to insure that the correct admixture has been loaded on the truck. The use of uniquely shaped and sized chemical additive containers could insure that the containers are placed in the right place on the truck. Each intake valve 404 could be specific to a particular type, size and shape chemical additive container. In each case, the information on the additives installed is delivered to the RSP 24 for use in conjunction with its operations in controlling mixing and additives. The tagging or other system can thereby insure that the RSP 24 properly identifies the chemical additives in the containers.

The Ready Slump Processor 24 could receive load information regarding chemical additions directly from the ticket (dispatch software) or via batch commands before or after the batching has been completed. Information transmitted to the RSP 24 via cellular, 418, 433, or 900 MHZ radio. Also 2.4 GHZ or any other wireless transmission. Logic embedded in the ADS 400 will instruct when dispensing of the chemicals can take place (at plant after batching, en route to the jobsite or on the jobsite). Separate mixing methods may be sent to the RSP 24 along with amount of chemicals being dispensed. In cases where more than one chemical is being added to a load, proper sequencing order may also be transmitted to the RSP 24. Based on load monitoring ability of the RSP 24 and various sensors throughout the ADS 400, alerts may be sent back to inform personnel of specific concerns or actions that may need to be taken with the load. The RSP 24 can make automatic adjustments by addition of chemical additives to the load when certain criteria are met. Various chemicals and water additions may be loaded into the truck externally via a standpipe or other external device.

Referring now to FIG. 7C, in one embodiment, RSP 24 receives wireless instructions from an external additive control system 410 via wireless communications, and uses these instructions to determine when to open and close valves to dispense the measured quantity of various liquids into the mixing drum. In this embodiment, the chemical additive stored on the delivery vehicle is determined at the batch plant and the filling of the additive tanks 402 and water tank 402 are managed by additive control system 410 by instructing the delivery of additive and/or water to those tanks from storage tanks 414 located at the batch plant, at the time the vehicle's mixer drum is being charged with a load. In this embodiment, therefore, any variety of recipes for additive and water may be controlled from the batch plant by the control system 410. The truck further includes a printer 418 for printing receipts to verify the additives delivered and to provide the recipe to the driver and/or for paper recordkeeping.

Chemical additive additions may be initiated remotely. Specifically, commands may be sent via a communication device to the RSP 24 while the vehicle is en route to a job site or at the job. The RSP 24 could control the opening and closing of the intake valves 404 and the measurement of the various additives into the truck along with ensuring mix completion.

All activity associated with the load can be stored in a database. It can be possible to calculate how much of each chemical additive has been put into each load. This information could be sent to the ready mix producer who may bill customers for admixture usage. The information can also be used for analysis on mix, driver and plant performance. It would also be possible to bill readymix producers based on usage run through the ADS 400. The ADS 400 could interface with a printer in the truck to supply customer with receipt of additives dispatched into the truck after the initial batch. The ADS 400 could also allow for inventory of additives on the truck.

The ADS 400 may lock out drum control until certain actions have been taken. For loads that require an admixture to be added on the jobsite, the ADS 400 will not allow the drum to turn in the discharge direction until admixture has been added and mixed. The ADS 400 can automatically purge lines after chemical additions and could allow for admixes to be refilled and reloaded.

FIG. 7B is a table of some possible types of chemical additives which could be used in the ADS 400. It should be noted that this table constitutes a small sample of all the possible types of additives and should not limit the scope of the present invention.

Figure 8:
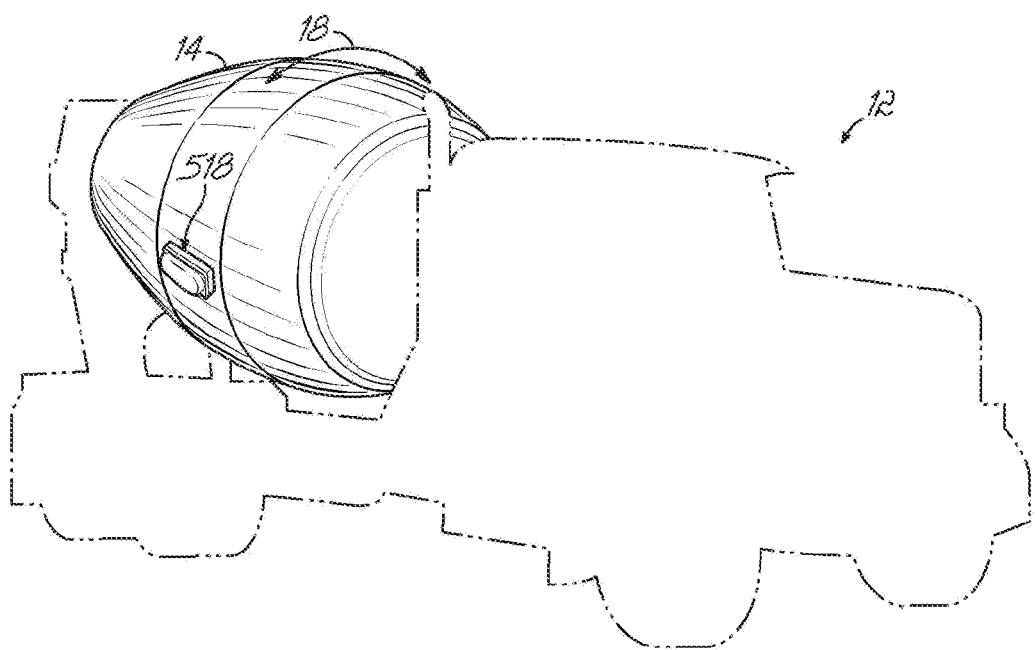
FIG. 8 is a side view of a concrete mixing truck to illustrate the location of the access door on the side of the mixing drum.

FIG. 8 illustrates the location of the mixing drum access door 518 on the mixing drum 14. The mixing drum access door 518 is a convenient location for a temperature sensor such as a dual temperature sensor 17 elaborated below. In the disclosed embodiment, the sensor is attached to the exterior of the access door. In other embodiments, the sensor could be attached elsewhere on the concrete drum other than the exterior portion of the access door, and may be attached to other concrete mixing equipment such as a stationary drum or a portable mixer. Furthermore, in alternative embodiments, a noncontact temperature sensor, such as an infrared sensor, may be used to measure the temperature of the load without requiring contact therewith.

Figure 9:
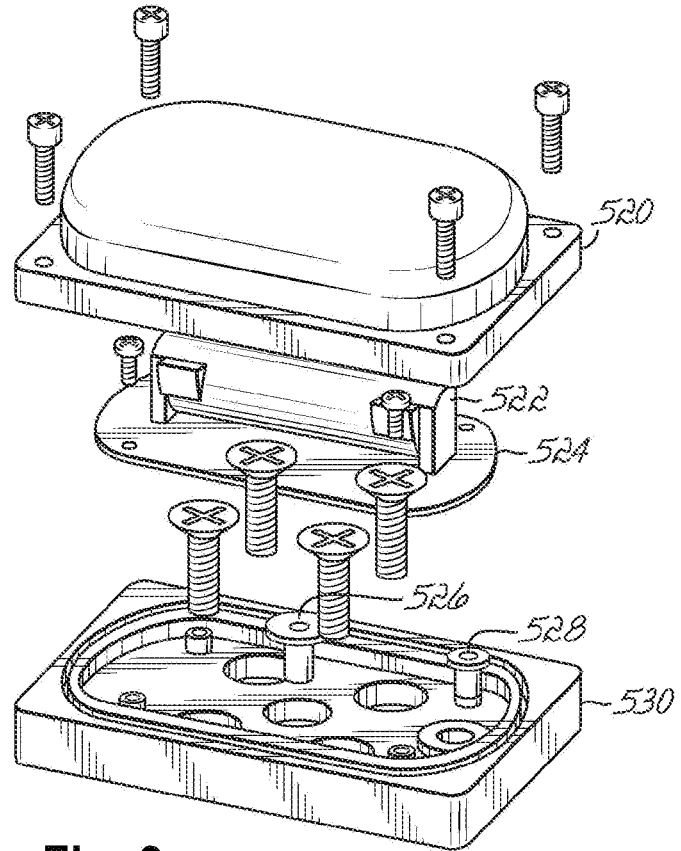
FIG. 9 is an exploded view of the dual temperature sensor.

Referring now to FIG. 9, the sensor mounted to the mixing drum access door 518 may use a dual temperature sensor mount 530. The load temperature sensor 526 could be a thermocouple which protrudes through the center of the mount, through the mixing drum access door skin and into the load. It should be noted that the load sensor is insulated from the mount and the drum skin. The load sensor is hardened using a plasma spray process and streamlined to permit a smooth flow of the load over the sensor. The plasma spray process used for hardening the sensor uses inert gas—usually nitrogen or argon—excited by a pulsed DC arc to ionize the gas and produce plasma. Other gasses—mainly hydrogen and helium—are often introduced in small quantity in order to increase the ionization. The plasma gasses are introduced at high volume and high velocity, and are ionized to produce a plume that ranges in temperature from about 12,000° to 30,000° F. Powder feedstock is then injected into this hot gas stream (called a plume), heated very quickly, and deposited onto the work piece. Thermal spray coatings, more specifically plasma spray, are often used to protect against abrasion, erosion, adhesive wear, fretting, galling, and cavitation. Abrasion and erosion are regularly addressed using tungsten carbide coatings along with a series of superalloys. The plasma spray process is available through CTS 5901 Creek Road Cincinnati, Ohio 45242. The skin temperature sensor 528 also could be a thermocouple, which protrudes through the corner of the mount, and makes contact with the mixing drum skin. Circuit board 524 is affixed to the dual temperature sensor mount 530 using four screws, and contains the thermocouple control and the radio transmitter control. A radio antenna 522 is attached to the circuit board. The dual temperature sensor cover 520 is affixed to the dual temperature sensor mount 530 using four screws. The dual temperature sensor could be battery powered.

Using a temperature sensor, temperature readings taken from the mixing drum, can be utilized as a factor when calculating the slump profile. It should also be noted that a separate device could be used in measuring the ambient air temperature. Furthermore, the load temperature may be used to identify, from among a group of loads, which are hottest and thus determine the order in which the loads should be poured. Furthermore, the time left until a load will set, and the effect or need for additives, can be derived from load temperature. Finally, the temperature profile measured by the sensor as the drum is rotating may be used to identify the load size as noted above.

Figure 10:
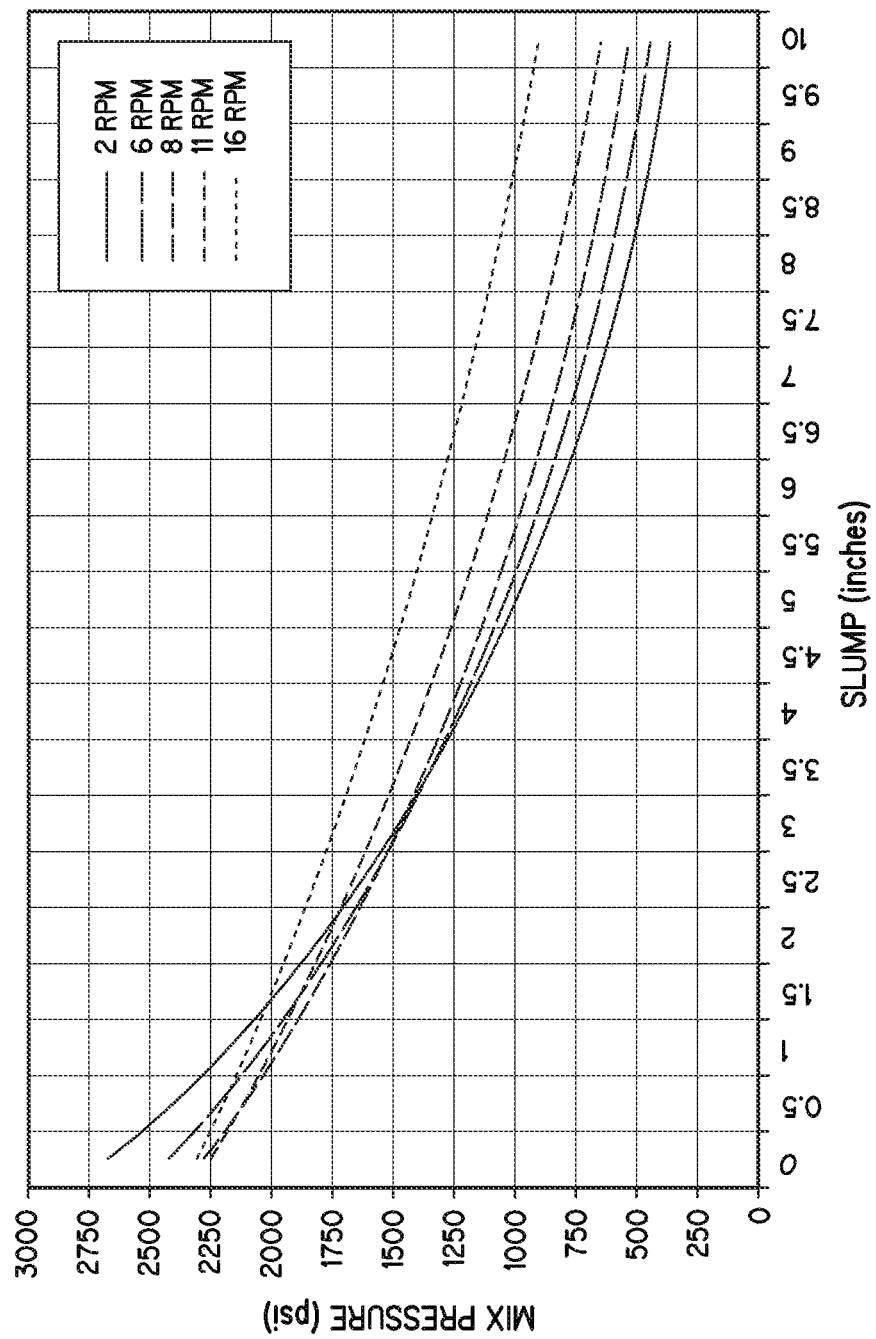
FIG. 10 is an illustration of the relationship between hydraulic mix pressure and slump.

FIG. 10 illustrates the relationship between the hydraulic mix pressure applied to a drum of ready mix concrete and the slump of the concrete. The relationship is dependent on the revolutions per minute of drum rotation. As the RPMs increase the relationship becomes more linear in nature, as the RPMs decrease the relationship becomes more logarithmic. It should be noted that there are other factors that can affect the slump profile. Some of these factors are truck tilt, load size, load weight, truck hydraulic equipment and truck acceleration/deceleration. Relationships utilizing these factors could be taken into account when developing a slump profile.

Figure 11:
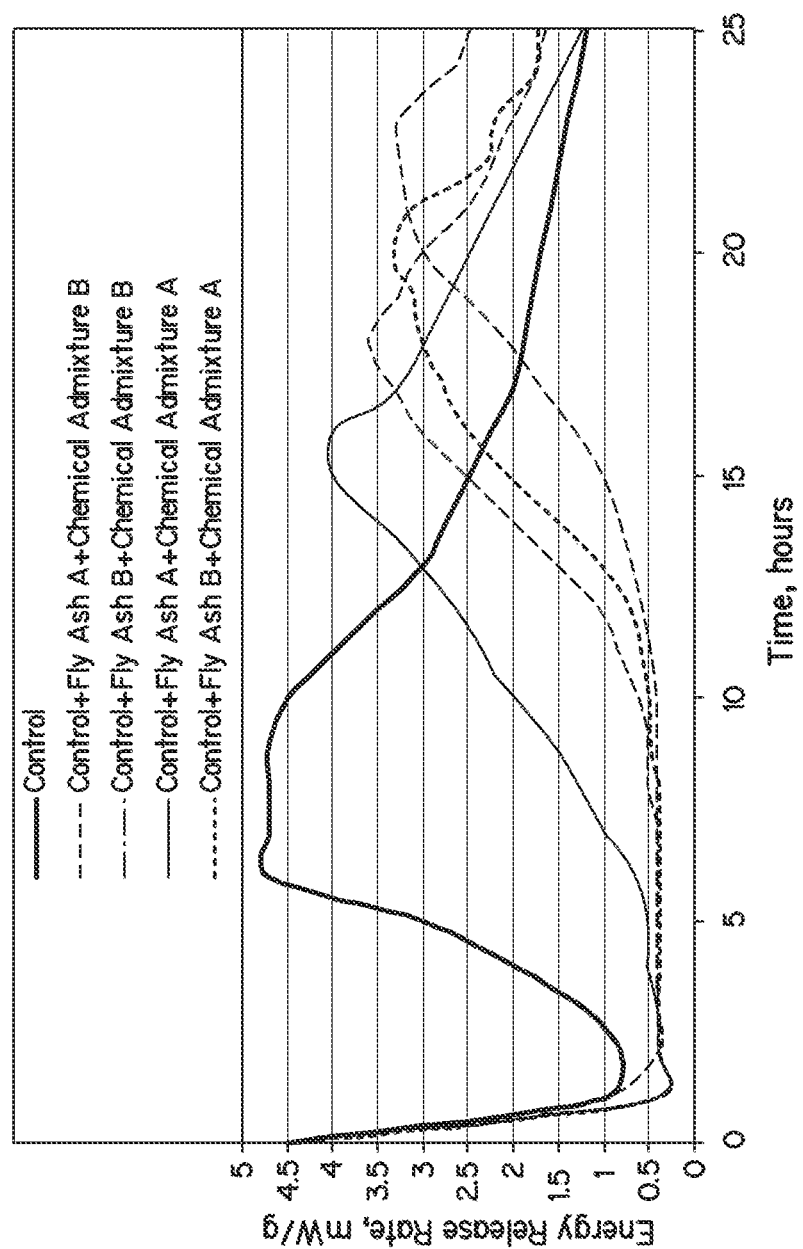
FIG. 11 is an illustration of the relationship of the Energy Release Rate to the relative time for concrete to go through a hydration process as it pertains to mix composition.

FIG. 11 illustrates the relationship between concrete energy release rate and time as it pertains to mix composition. The information is adapted from an article published in the April 2006 edition of Concrete International, authored by Hugh Wang, C.Qi, Hamid Farzam, and Jim Turici. The integral of the area under the release rate curves, is the total released heat during the hydration process. The total amount of heat released is related to the cement reactivity which, in turn, reflects the strength development of the concrete. Therefore utilizing the dual temperature sensor 17 to obtain a temperature reading with respect to time within the mixing drum 14 could be used to determine the strength of the cured concrete. It should be noted that the wireless nature of the dual temperature sensor permits the ready use of the sensor on a rotating drum without the difficulties associated with establishing wired connections from the sensor to a control console. Furthermore, as noted above, a wireless sensor as described herein may be utilized in conjunction with other types of mixers, not limited to concrete trucks, such as stationary or portable or semi-portable rotating mixers.

As noted above, various statistics and parameters are used by the ready slump processor in operation. These statistics and parameters are available for upload from the processor to the central office, and can be downloaded to the processor, as part of a messaging operation. Some values are overwritten repeatedly during processing, but others are retained until the completion of a delivery cycle, as is elaborated above. The above-referenced US Patent application incorporates a specific listing of statistics and parameters for one specific embodiment of the invention, and other selections of parameters and statistics may be gathered as well.

While the present invention has been illustrated by a description of embodiments and while these embodiments have been described in some detail, it is not the intention of the Applicants to restrict or in any way limit the scope of the appended claims to such detail. Additional advantages and modifications other than those specifically mentioned herein will readily appear to those skilled in the art.

For example, the status monitoring and tracking system may aid the operator in managing drum rotation speed, e.g., by suggesting drum transmission shifts during highway driving, and managing high speed and reduced speed rotation for mixing. Furthermore, fast mixing may be requested by the ready slump processor when the concrete is over-wet, i.e., has an excessive slump, since fast mixing will speed drying. It will be further appreciated that automatic control of drum speed or of the drum transmission could facilitate such operations.

The computation of mixing speed and/or the automatic addition of water, may also take into account the distance to the job site; the concrete may be brought to a higher slump when further from the job site so that the slump will be retained during transit.

Further sensors may be incorporated, e.g., an accelerometer sensor or vibration sensor such as shown in FIG. 6 may be utilized to detect drum loading as well as detect the on/off state of the truck engine. Environmental sensors (e.g., humidity, barometric pressure) may be used to refine slump computations and/or water management. More water may be required in dry weather and less water in wet or humid weather.

A warning may be provided prior to the automatic addition of water, so that the operator may prevent automatic addition of water before it starts, if so desired.

Finally, the drum management process might be made synchronous to drum rotation, i.e., to capture pressure at each amount of angular motion of the drum. Angular motion of the drum might be signaled by the magnetic sensor detecting a magnet on the drum passing the sensor, or may be signaled from a given number of "ticks" of the speed sensor built into the motor, or may be signaled by an auxiliary processor coupled to a wireless accelerometer based drum rotation sensor. To facilitate such operation it may be fruitful to position the magnetic sensors at angularly equal spacing so that the signal generated by a magnet passing a sensor is reflective of a given amount of angular rotation of the drum.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. For example, all of the above concepts can apply to both front and rear discharge trucks.

The invention claimed is:

1. A system for managing one or more conditions of concrete in a concrete delivery vehicle from immediately after concrete is loaded on said vehicle at the batch plant and the loaded ingredients are mixed until discharge from said vehicle, comprising:
   a mixing drum for containing concrete and mounted on said concrete delivery vehicle;
   a controller mounted on said concrete delivery vehicle;
   a chemical additive supply coupled to the controller and mounted on said concrete delivery vehicle, the chemical additive supply comprising two or more supply containers each containing a different chemical additive; and
   fluid connections between said supply containers and said mixing drum;
   a temperature sensor mounted to said mixing drum, and optionally one or more of a hydraulic pressure sensor mounted to said delivery vehicle to determine an amount of hydraulic pressure to rotate the said mixing drum, and a drum speed sensor mounted to the said deliver vehicle or the said mixing drum;
   said controller obtaining information on a condition of said concrete, and in response causing said chemical additive supply to selectively deliver chemical additive to said concrete,
   wherein the controller collects data on the condition of said concrete from two or more of:
   a temperature measurement of said concrete;
   rate or amount of measured temperature change of said concrete measured during a time period; and
a measured amount of energy required in mixing said concrete; and
measured completion of mixing of said concrete.

2. The system of claim 1, wherein the chemical additives comprise two or more of:
   a curing accelerator;
   a curing retarder;
   a viscosity modifier;
   a plasticizer;
   a hydration stabilizer;
   an air entraining agent;
   a specialty application admixture; and
   a liquid color system.

3. A system for managing one or more conditions of concrete in a concrete delivery vehicle from immediately after concrete is loaded on said vehicle at the batch plant and the loaded ingredients are mixed until discharge from said vehicle, comprising:
   a mixing drum for containing concrete and mounted on said concrete delivery vehicle;
   a controller mounted on said concrete delivery vehicle;
   a chemical additive supply coupled to the controller and mounted on said concrete delivery vehicle, the chemical additive supply comprising a supply container containing a chemical additive; and
   fluid connections between said supply container and said mixing drum;

a temperature sensor mounted to said mixing drum, and one or more of a hydraulic pressure sensor mounted to said delivery vehicle to determine amount of hydraulic pressure to rotate the said mixing drum, and a drum speed sensor mounted to the said deliver vehicle or the said mixing drum;

said controller obtaining information on a condition of said concrete, and in response causing said chemical additive supply to selectively deliver chemical additive to said concrete, wherein the controller collects data on the condition of said concrete from two or more of:

a temperature measurement of said concrete;

rate or amount of measured temperature change of said concrete measured during a time period; and a measured amount of work energy required in mixing said concrete; and measured completion of mixing of said concrete.

4. The system of claim 3, wherein the chemical additive comprises on or more of:

a curing accelerator;
a curing retarder;
a viscosity modifier;
a plasticizer;
a hydration stabilizer;
an air entraining agent;
a specialty application admixture; and
a liquid color system.

* * * * *